United States Patent
Catovic et al.

(10) Patent No.: US 8,942,746 B2
(45) Date of Patent: Jan. 27, 2015

(54) RESOURCE MANAGEMENT AND ADMISSION CONTROL FOR NON-MEMBERS OF A CLOSED SUBSCRIBER GROUP IN HOME RADIO ACCESS NETWORKS

(75) Inventors: Amer Catovic, San Diego, CA (US); Gavin Bernard Horn, La Jolla, CA (US)

(73) Assignee: QUALCOMM Incorporated, San Diego, CA (US)

(*) Notice: Subject to any disclaimer, the term of this patent is extended or adjusted under 35 U.S.C. 154(b) by 650 days.

(21) Appl. No.: 12/875,779

(22) Filed: Sep. 3, 2010

(65) Prior Publication Data

US 2011/0218004 A1 Sep. 8, 2011

Related U.S. Application Data

(60) Provisional application No. 61/256,118, filed on Oct. 29, 2009.

(51) Int. Cl.
*H04B 7/00* (2006.01)
*H04B 15/00* (2006.01)
*H04W 72/00* (2009.01)
*H04W 48/02* (2009.01)
(Continued)

(52) U.S. Cl.
CPC .............. *H04W 48/02* (2013.01); *H04W 4/08* (2013.01); *H04W 84/045* (2013.01); *H04W 84/105* (2013.01); *H04W 72/048* (2013.01)
USPC ............ 455/509; 455/500; 455/501; 455/451

(58) Field of Classification Search
CPC ............................. H04W 72/00; H04W 16/32
USPC .......................... 455/509, 507, 510, 512, 513
See application file for complete search history.

(56) References Cited

U.S. PATENT DOCUMENTS 6,901,259 B2 * 5/2005 Dorenbosch .................. 455/453
8,665,813 B2 * 3/2014 Golitschek Edler Von Elbwart ........................ 370/329
(Continued)

FOREIGN PATENT DOCUMENTS

JP 2008079192 A 4/2008
WO 2006088082 A1 8/2006

OTHER PUBLICATIONS

3rd Generation Partnership Project; Technical Specification Group Services and System Aspects; Architecture aspects of Home NodeB and Home eNodeB (Release 9), 3GPP Standard; 3GPP TR 23.830, 3rd Generation Partnership Project (3GPP), Mobile Competence Centre ; 650, Route Des Lucioles ; F-06921 Sophia-Antipolis Cedex ; France, No. V9.0.0, Sep. 1, 2009, pp. 1-55, XP050363911.

(Continued)

*Primary Examiner* — Tilahun B Gesesse
(74) *Attorney, Agent, or Firm* — François A. Pelaez

(57) ABSTRACT

Systems and methodologies are described that facilitate resource management and admission control with respect to non-members of a closed subscriber group associated with femto access points. A set of parameters can be provisions to a femto access point, wherein the set of parameters specify an access mode, a maximum number of concurrent non-members, and/or a maximum amount of resources assignable to non-members. The femto access point can implement resource scheduling decisions and/or access control decisions in accordance with the set of parameters.

44 Claims, 18 Drawing Sheets

(51) Int. Cl.
   *H04W 4/08* (2009.01)
   *H04W 84/04* (2009.01)
   *H04W 84/10* (2009.01)
   *H04W 72/04* (2009.01)

(56) References Cited

U.S. PATENT DOCUMENTS

| | | | | |
|---|---|---|---|---|
| 8,687,541 | B2* | 4/2014 | Lohr et al. | 370/318 |
| 2006/0052103 | A1* | 3/2006 | Mikoshiba et al. | 455/435.3 |
| 2009/0029710 | A1 | 1/2009 | Ochiai et al. | |
| 2009/0070694 | A1* | 3/2009 | Ore et al. | 715/764 |
| 2009/0232015 | A1* | 9/2009 | Domschitz et al. | 370/252 |
| 2010/0029282 | A1* | 2/2010 | Stamoulis et al. | 455/436 |
| 2010/0227611 | A1* | 9/2010 | Schmidt et al. | 455/434 |
| 2010/0240373 | A1* | 9/2010 | Ji et al. | 455/436 |
| 2010/0265827 | A1* | 10/2010 | Horn et al. | 370/241 |
| 2012/0184242 | A1* | 7/2012 | Li et al. | 455/406 |

OTHER PUBLICATIONS

3rd Generation Partnership Project; Technical Specification Group Services and System Aspects; Service requirements for Home eNodeBs and Home eNodeBs (Release 10), 3GPP Standard; 3GPP TS 22.220, 3rd Generation Partnership Project (3GPP), Mobile Competence Centre; 650, Route Des Lucioles; F-06921 Sophia-Antipolis Cedex; France, No. V10.0.0, Sep. 1, 2009, pp. 1-22, XP050361159.
Institute for Information Industry (III) et al: "Resource priority region for hybrid access mode HeNB", 3GPP Draft; R4-094001_Resource_Priority_Region_for_Hybrid_Access_HENB, 3rd Generation Partnership Project (3GPP), Mobile Competence Centre; 650, Route Des Lucioles; F-06921 Sophiaantipolis Cedex; France, No. Miyazaki; Oct. 12, 2009, XP050393561, [retrieved on Oct. 19, 2009].
International Search Report and Written Opinion—PCT/US2010/054555, International Search Authority—European Patent Office—Jan. 28, 2011.
NTT Docomo et al: "Prioritised access control in hybrid cell", 3GPP Draft; R2-094946 AC Barring for Hybrid Cell, 3rd Generation Partnership Project (3GPP), Mobile Competence Centre; 650, Route Des Lucioles; F-06921 Sophia-Antipolis Cedex; France, No. Shenzhen, China; Aug. 18, 2009, XP050352878, [retrieved on Aug. 18, 2009].
QUALCOMM Europe: "QoS support for Hybrid CSG cells", 3GPP Draft; R3-091482, 3rd Generation Partnership Project (3GPP), Mobile Competence Centre; 650, Route Des Lucioles; F-06921 Sophia-Antipolis Cedex; France, No. Chiba, Japan; May 18, 2009, XP050344536, [retrieved on May 18, 2009].
Taiwan Search Report—TW099136987—TIPO—May 20, 2013.

* cited by examiner

RESOURCE MANAGEMENT AND ADMISSION CONTROL FOR NON-MEMBERS OF A CLOSED SUBSCRIBER GROUP IN HOME RADIO ACCESS NETWORKS

CLAIM OF PRIORITY UNDER 35 U.S.C. §119

The present Application for Patent claims priority to U.S. Provisional Application Ser. No. 61/256,118, filed Oct. 29, 2009, entitled "Network controlled resource allocation to non-CSG members in home radio access networks." The aforementioned U.S. Provisional Application is assigned to the assignee hereof and hereby expressly incorporated by reference in its entirety.

BACKGROUND

I. Field

The following description relates generally to wireless communications systems, and more particularly to resource management and admission control for femto access points II. Background Wireless communication systems are widely deployed to provide various types of communication content such as voice and data. Typical wireless communication systems may be multiple-access systems capable of supporting communication with multiple users by sharing available system resources (e.g., bandwidth, time, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, High Speed Packet Access (HSPA), High Speed Downlink Packet Access (HSDPA), High Speed Uplink Packet Access (HSUPA), 3GPP long-term evolution (LTE), LTE Advanced (LTE-A), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Wireless communication systems can be configured to include a series of wireless access points, which can provide coverage for respective locations within the system. Such a network structure is generally referred to as a cellular network structure, and access points and/or the locations they respectively serve in the network are generally referred to as cells.

In addition to mobile telephone networks currently in place, a new class of small base stations has emerged, which can be installed in the home of a user and provide indoor wireless coverage to mobile units using existing broadband Internet connections. Such personal miniature base stations are generally known as access point base stations, or, alternatively, Home Node B (HNB), Home eNodeB (HeNB) or femto cells. Typically, such miniature base stations are connected to the Internet and the network of a mobile operator via a Digital Subscriber Line (DSL) router, cable modem, or the like.

A femto cell can be associated with a closed subscriber group (CSG) such that only mobile devices within the CSG can access and/or attain service from the femto cell. However, nonetheless, a femto cell can be configured to operate in an open mode, a closed mode, or a hybrid mode. In an open mode, the femto cell is configured to allow access to any mobile devices capable of accessing the femto cell. In a closed mode, the femto cell serves only mobile devices included in the CSG. In a hybrid mode, the femto cell provides service to member mobile devices (e.g., mobiles within the CSG) and non-member mobile devices. Typically, the femto cell gives priority to member mobile devices over non-member mobile devices while operating in a hybrid mode.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating resource management and admission control with respect to non-members of a closed subscriber group associated with home access points. A set of parameters can be provisions to a home access point, wherein the set of parameters specify an access mode, a maximum number of concurrent non-members, and/or a maximum amount of resources assignable to non-members. The home access point can implement resource scheduling and/or access control in view of the set of parameters.

According to a first aspect, a method for scheduling resources for a home base station operating in a hybrid access mode. The method can include identifying whether a mobile device, connected to the home base station, is a member or non-member of a closed subscriber group associated with the home base station. In addition, the method can include assigning resources for data transmission to the mobile device in accordance with a parameter when the mobile device is a non-member, wherein the parameter indicates a level of resources to provide to non-members of the closed subscriber group.

Another aspect relates to a wireless communication apparatus. The wireless communication apparatus can include at least one processor configured to identify whether a mobile device, connected to the wireless communication apparatus, is a member or non-member of a closed subscriber group. In addition, the at least one processor is further configured to assign resources for data transmission to the mobile device in accordance with a parameter when the mobile device is a non-member, wherein the parameter indicates a level of resources to provide to non-members of the closed subscriber group.

Yet another aspect relates to an apparatus that can include means for identifying whether a mobile device, connected to the apparatus, is a member or non-member of a closed subscriber group. In addition, the apparatus can further include means for assigning resources for data transmission to the mobile device in accordance with a parameter when the mobile device is a non-member, wherein the parameter indicates a level of resources to provide to non-members of the closed subscriber group.

Still another aspect relates to a computer program product that can comprise a computer-readable medium. The computer-readable medium can include code for causing at least one computer to identify whether a mobile device, connected to a home base station, is a member or non-member of a closed subscriber group associated with the home base station. In addition, the computer-readable medium can include code for causing the at least one computer to assign resources for data transmission to the mobile device in accordance with a parameter when the mobile device is a non-member, wherein the parameter indicates a level of resources to provide to non-members of the closed subscriber group.

In accordance with another aspect, an apparatus is described. The apparatus can include an identification module that determines whether a mobile device is one of a member or non-member of a closed subscriber group. The apparatus can further include a scheduler that assigns resources to the mobile device. In addition, the apparatus can include a resource control module that restricts an amount of resources assigned to the mobile device, in accordance with a parameter, when the mobile device is a non-member of the closed subscriber group.

According to another aspect, a method for managing access to a home base station is described. The method can include receiving a request, from a mobile device, to establish a connection. The method can further include identifying whether the mobile device is one of a member or a non-member of a closed subscriber group associated with the home base station. In addition, the method can include determining whether to admit or deny the mobile device based at least in part on a parameter, wherein the parameter specifies a maximum number of concurrent non-member users.

Another aspect relates to wireless communication apparatus. The wireless communication apparatus can include at least one processor configured to receive a request, from a mobile device, to establish a connection. The at least one processor can be further configured to identify whether the mobile device is one of a member or a non-member of a closed subscriber group associated with the wireless communication apparatus. In addition, the at least one processor can be configured to determine whether to admit or deny the mobile device based at least in part on a parameter, wherein the parameter specifies a maximum number of concurrent non-member users.

Yet another aspect relates to an apparatus that can include means for receiving a request, from a mobile device, to establish a connection. The apparatus can further include means for identifying whether the mobile device is one of a member or a non-member of a closed subscriber group associated with the apparatus. In addition, the apparatus can include means for determining whether to admit or deny the mobile device based at least in part on a parameter, wherein the parameter specifies a maximum number of concurrent non-member users.

Still another aspect relates to a computer program product that can comprise a computer-readable medium. The computer-readable medium can include code for causing at least one computer to receive a request, from a mobile device, to establish a connection. The computer-readable medium can include code for causing the at least one computer to identify whether the mobile device is one of a member or a non-member of a closed subscriber group associated with a home base station. In addition, the computer-readable medium can include code for causing the at least one computer to determine whether to admit or deny the mobile device based at least in part on a parameter, wherein the parameter specifies a maximum number of concurrent non-member users.

In accordance with another aspect, an apparatus is described. The apparatus can include an identification module that determines whether a mobile device is one of a member or non-member of a closed subscriber group. In addition, the apparatus can include an access control module that determines whether to establish a connection with the mobile device based upon a parameter, when the mobile device is a non-member of the closed subscriber group.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
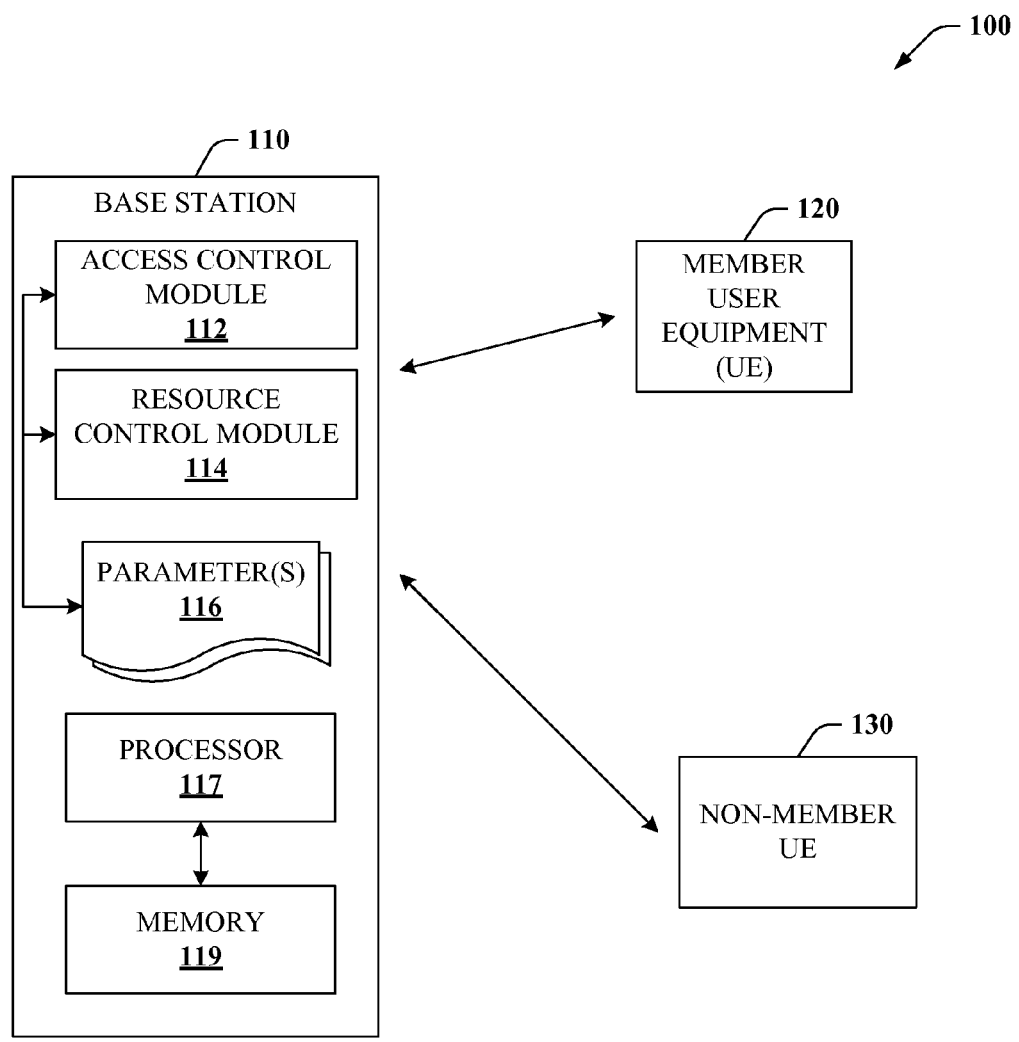
FIG. 1 illustrates an example wireless communication system that facilitates serving members and non-members of a closed subscriber group (CSG) concurrently during hybrid mode operations in accordance with various aspects.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to computer-related entities such as: hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as, in accordance with a signal, having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point, Node B, or evolved Node B (eNB)) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, High Speed Packet Access (HSPA), High Speed Downlink Packet Access (HSDPA), High Speed Uplink Packet Access (HSUPA), etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. HSPA, HSDPA, HSUPA, UTRA, E-UTRA, UMTS, LTE, LTE-A, SAE, EPC, and GSM are described in documents from an organization named "3rd Generation Partnership Project" (3GPP). Further, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques. For clarity, terminology associated with WCDMA, HSPA, HSDPA, and HSUPA are employed in description below. However, it is to be appreciated that the claims appended hereto are not intended to be limited to WCDMA, HSPA, HSDPA, and HSUPA, unless explicitly done so.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects will be presented in terms of systems that can include a number of devices, components, modules, and the like. It is to be understood and appreciated that the various systems can include additional devices, components, modules, etc. and/or not include all of the devices, components, modules etc. discussed in connection with the figures. A combination of these approaches can also be used.

Referring now to the drawings, FIG. 1 illustrates an example wireless communication system 100 that facilitates serving members and non-members of a closed subscriber group (CSG) concurrently during hybrid mode operations of a femto cell. Wireless communication system 100 includes a base station 110, a first or member user equipment (UE) 120, and a second or non-member UE 130. Base station 110 can wirelessly communicate with UEs 120 and 130 via respective uplink and/or downlink channels. While, to facilitate explanation, only one base station (e.g., base station 110) and two UEs (e.g., UEs 120 and 130) are illustrated in FIG. 1, it should be appreciated that system 100 can include any number of UEs and/or base stations.

Base station 110, in an aspect, can be an access point, an access node, a NodeB (NB), an evolved NodeB (eNB), a home NodeB (HNB), or a home eNodeB (HeNB) and/or interchangeably referred to as an access point, an access node, a home access point, a home access node, a home base station, etc. In addition, base station 110 can be a base station having one of a variety of power classes. For instance, base station 110 can be a macro base station, a femto base station, a pico base station, etc. In an example, macro base stations generally operate to cover a larger geographic area such as a neighborhood, city, region, etc. For instance, a macro base station can be associated with a macro cell ranging from one kilometer in size to 100 kilometers. Femto base stations and/or pico base stations can provide wireless communication services over a smaller area (e.g., a femto cell or pico cell) such as a building, a house, etc.

In addition, UEs 120 and UE 130 can be referred to as a mobile device, a mobile terminal, a mobile station, a station, a wireless terminal, or the like. Further, it should be appreciated that system 100 can operate in a 3GPP LTE or LTE-A wireless network, an WCDMA wireless network, an OFDMA wireless network, a CDMA network, a 3GPP2 CDMA2000 network, an EV-DO network, a WiMAX network, a HSPA network, etc. While aspects described below are explained with LTE terminology with respect to a LTE network and/or LTE radio access technology, it is to be appreciated that techniques described herein can be utilized within the above networks as well as in other wireless networks and/or radio access technologies.

In accordance with an aspect of the subject disclosure, base station 110 can be associated with a femto cell (e.g., base station 110 comprises a HeNB, HNB, home base station, or other small scale (femto) access point). Base station 110 can implement a standard femto access point data model to facilitate efficient configuration and deployment of base station 110. The data model organizes and categorizes a plurality of control and configuration parameters, which dictate operation of femto access points. A mobile operator, which provides base station 110, can provision parameters in accordance with the data model via a management system, such as an HNB management system (HMS).

Figure 2:
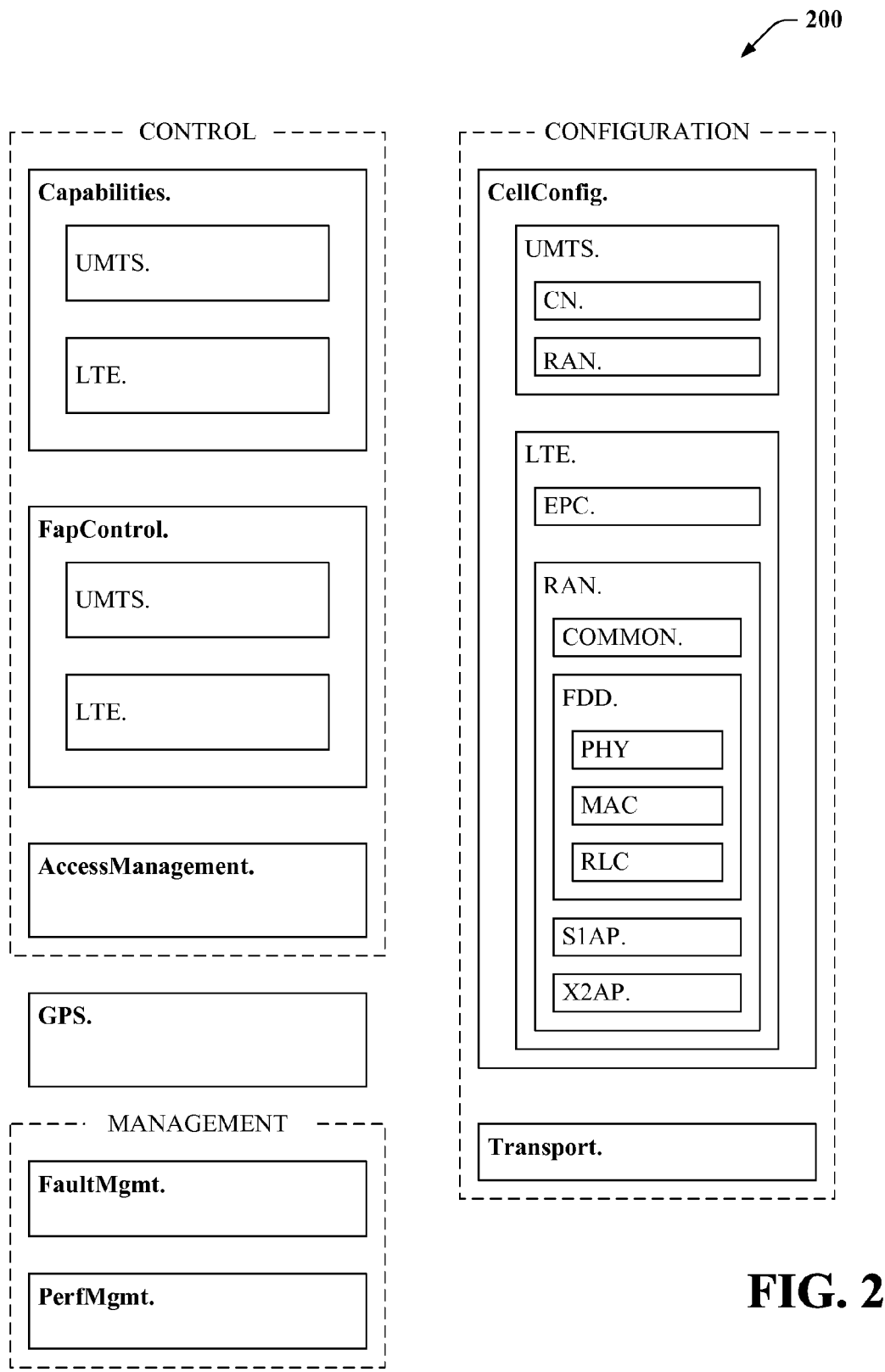
FIG. 2 is an illustration of example data model that can be employed by a femto access point in accordance with various aspects.

FIG. 2 illustrates an example data model 200 which can be utilized by base station 110 in accordance with an aspect. Data model 200 is one example and it is to be appreciated that base station 110 can employ alternative data models. As depicted in FIG. 2, multiple top level groups (e.g., Capabilities, FapControl, CellConfig, Transport, . . . ) can be loosely associated into divisions. For instance, the Capabilities, FapControl, and AccessManagement groups are associated under Control and the CellConfig and Transport groups are associated under Configuration. In an example, a top level group can include a plurality of sub-groups and, moreover, each sub-group can include additional levels. While FIG. 2 depicts some groups and sub-groups of data model 200 to highlight the hierarchical nature of the data model, it is to be appreciated that additional levels can be incorporated into data model 200. In another example, data model 200 can accommodate parameters corresponding to disparate radio interface technologies. For instance, data model 200 can include different sub-groups or sub-sections to separately organize parameters unique to a particular radio interface technology, when necessary due to difference in technologies. As depicted in FIG. 2, several top level groups include a UMTS sub-group and a LTE sub-group, wherein the groups respectively include parameters corresponding to the UMTS and LTE. It is to be appreciated that data model 200 can extend beyond what is depicted in FIG. 2.

Returning to FIG. 1, base station 110, as femto base station, can be configured to operate in a variety of access modes such as, but not limited to, an open mode, a closed mode, or a hybrid mode. In the open mode, base station 110 does not enforce access restrictions on the basis of CSG membership. Accordingly, member UE 120, which is a member of the CSG associated with base station 110, and non-member UE 130, which is not a member of the CSG, can both access base station 110. In the closed mode, base station 110 operates as a closed cell such that only UEs which are members of the CSG are allowed access. In the hybrid mode, CSG membership is enforced, however, non-member UEs are allowed access.

While operating in the hybrid mode, base station 110 can restrict access to a relatively small number of non-CSG users and/or limit an amount resources granted to non-CSG users. In one aspect, base station 110 can include an access control module 112 that manages UE access. According to an example, access control module 112 can grant or deny an access request from a UE based upon a membership status of the UE and/or a current number of non-member UEs connected to base station 110. For instance, base station 110 can receive an access request (e.g., random access attempt, registration request, scheduling request, etc.) from member UE 120. As member UE 120 is included in the CSG associated with base station 110, access control module 112 grants access. Base station 110 can also receive an access request from non-member UE 130. Since non-member UE 130 is not included in the CSG, access control module 112 can determine to deny access to non-member 130. In one aspect, access control module 112 denies access to non-member UE 130 when a current number of connected non-member UEs is at a maximum.

In another aspect, base station 110 can include a resource control module 114 that manages resource allocations to non-CSG users. In an example, non-member UE 130 and member UE 120 are connected to base station 110. The UEs can have data to receive (e.g., downlink data transmitted by base station 110) and/or data to transmit (e.g., uplink data to be received by base station 110). Base station 110 schedules the UEs on the downlink and uplink in accordance with a scheduling algorithm implemented by a scheduler (not shown). For member UE 120, base station 110 can assign resources without additional restrictions beyond those that occur in a typical wireless communication system (e.g., system bandwidth, quality of service, available resources, quantity of data, etc.). For non-member UE 130, additional restrictions can be placed upon scheduling resources while base station 110 operates in a hybrid access mode. For instance, resource control module 114 can enforce scheduling restrictions such that non-members (e.g., UE 130) are allocated resources within pre-described limits.

According to a further aspect, base station 110 includes a set of parameters 116. The set of parameters 116 can comprise parameters that control access to base station 110 by non-members of the CSG and control a level of service provided to non-members. The set of parameters 116 can be a portion or subset of parameters included in data model 200. For example, the set of parameters 116 can include parameters included in AccessManagement group of data model 200. In particular, the set of parameters 116 can include an access mode parameter (e.g., AccessMode in data model 200), a maximum concurrent CSG user parameter (e.g., MaxConcurrentCSGUsers), a maximum concurrent non-CSG users parameter (e.g., MaxNonCSGUsers), a maximum resource level parameter for non-CSG users (e.g., MaxResourceNonCSGUsers), and the like. Access control mode 112 and resource control module 114 can influence access decisions and/or scheduling decisions, as described above, based upon the set of parameters 116.

As further illustrated in system 100, base station 110 can include a processor 117 and/or a memory 119, which can be utilized to implement some or all the functionality of access control module 112, resource control module 114, and/or other functionality or module of base station 110 described herein. In addition, memory 119 can retain the set of parameters 116 and/or data model 200.

Figure 3:
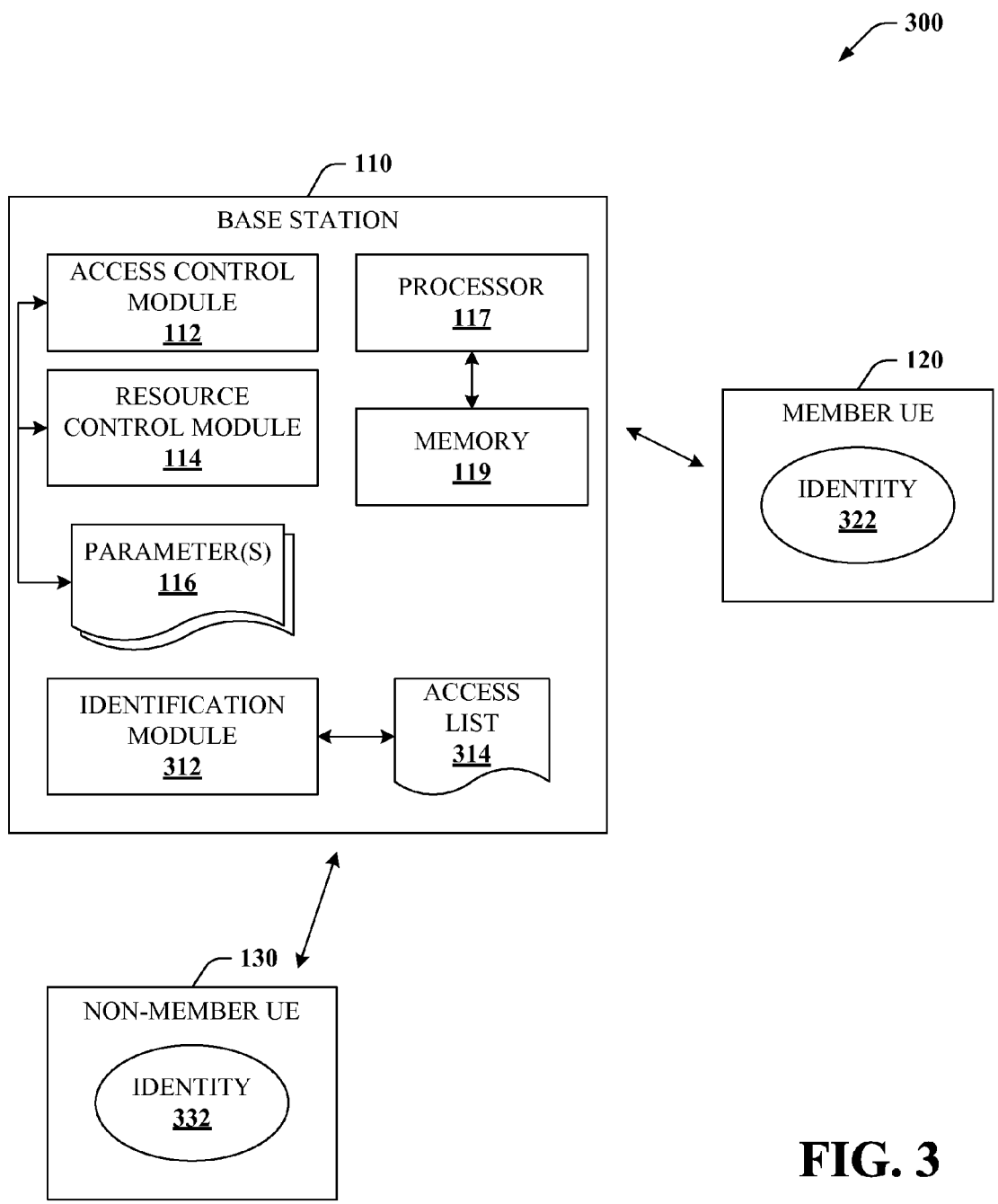
FIG. 3 is an illustration of an example system that facilitates identification of a UE as a member or non-member of a closed subscriber group according to various aspects.

Turning to FIG. 3, illustrated is a system 300 that facilitates identification of a UE as a member or non-member of a closed subscriber group (CSG). System 300 can include base station 110, member UE 120, and non-member UE 130 as described above with respect to previous figures.

In accordance with another aspect, member UE 120 and non-member UE 130 can include respective identities, namely, identity 322 and identity 332. Identities 322 and 332 can be encoded into unique identifiers respectively associated with member UE 120 and non-member UE 130. The unique identifiers conveying identities 322 and 332 can be assigned or provisioned by a network operator and/or a manufacturer. It is to be appreciated that the unique identifiers can adopt one of a variety of forms. By way of example, each unique identifier can be a network access identifier (NAI) or a mobile station integrated services digital network (MS ISDN) number. In addition, the unique identifier can be a subscriber identity such as an international mobile subscriber identity (IMSI) stored on a subscriber identity module (SIM). However, it is to be appreciated that the unique identifiers can adhere to any structure provided the unique identifiers can be employed to distinguish mobile devices. Further identities 322 and 332 can be unique within a network associated with base station 110, unique within a particular geographic area, and/or globally unique.

As part of acquisition and registration with base station 110, UEs 120 and 130 can convey identities 322 and 332, respectively. Base station 110 can include an identification module 312 that determines whether UEs 120 and 130 are members of the CSG based at least in part on identities 322 and 332. Identification module 312 obtains identities 322 and 332 transmitted as unique identifiers from UEs 120 and 130, respectively. Identification module 312 can employ an access list 314 to identify UEs as members of the CSG. Access list 314 enumerates identities of UEs within the CSG associated with base station 110. Identification module 312 can query access list 314 to determine whether a particular identity is included in the list and, therefore, the UE associated therewith is a member of the CSG.

For example, member UE 120 can transmit a registration message to base station 110, wherein the registration message includes a unique identifier that encodes identity 322. Identification module 312 can obtain or derive identity 322 from the unique identifier and/or the registration message, and employ the obtained identity 322 to query access list 314. If a match or hit occurs (e.g., identity 322 is included in access list 314), identification module 312 determines that member UE 120 is a member of the CSG. In another example, non-member UE 130 can transmit a registration message to base station 110, wherein the registration message includes a unique identifier conveying identity 332. Identification module 312 can obtain identity 332 from the unique identifier and/or the transmitted registration message. Subsequently, identification module 312 can look up identity 332 in access list 314 to determine whether or not access list 314 lists identity 332. When identification module 312 ascertains that identity 332 is not in access list 314, identification module 312 determines that UE 130 is not a member of the CSG.

As depicted in FIG. 3, system 300 can include access control module 112, resource control module 114, set of parameters 116, processor 117, and memory 119 described above. In an aspect, access control module 112 and resource control module 114 can implement access control and resource management based upon the set of parameters 116 and membership determinations provided by identification module 312. In addition, it is to be appreciated that memory 119 can be configured to retain access list 314 and processor 117 can be configured to implement the functionality of identification module 312.

Figure 4:
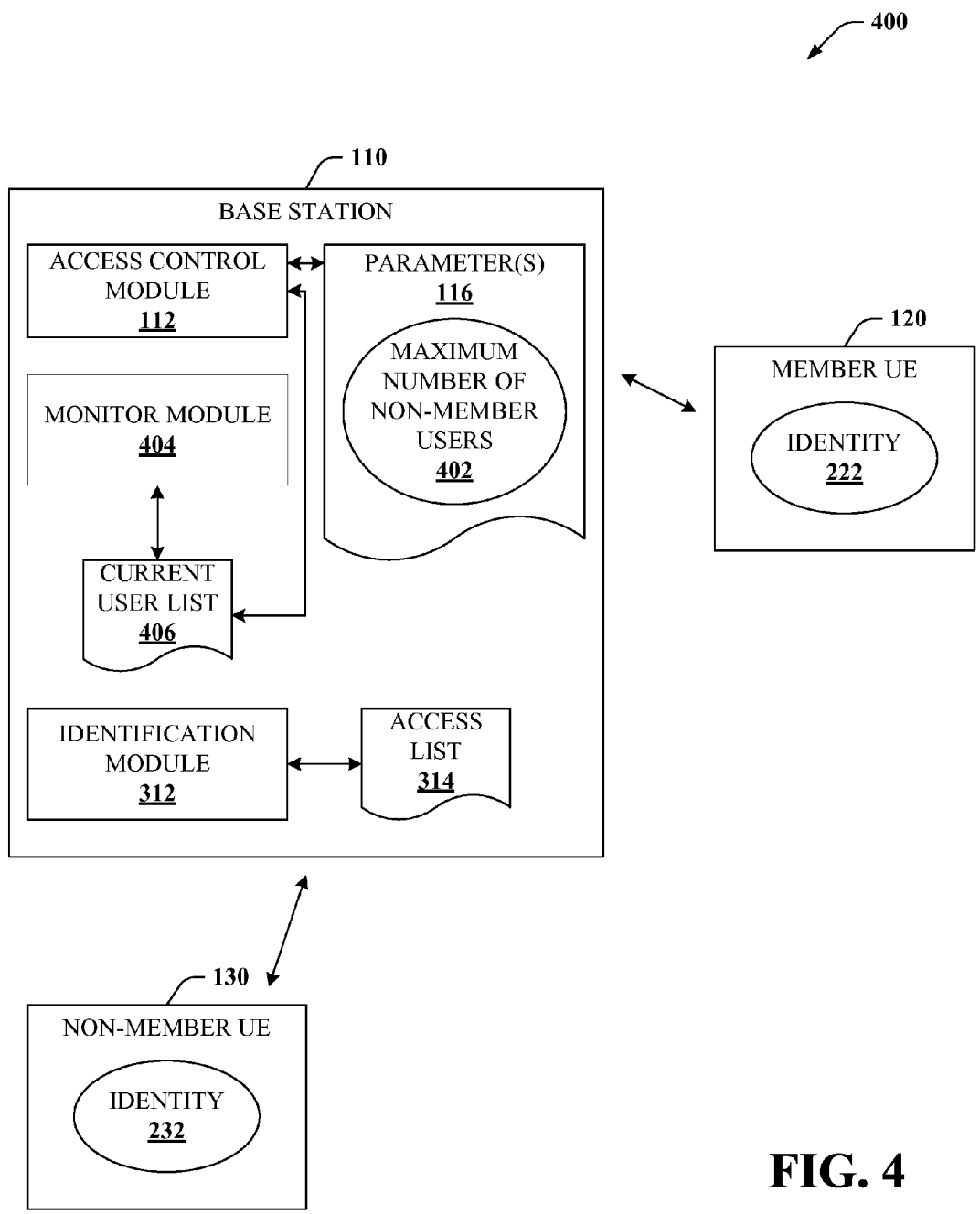
FIG. 4 illustrates an example system that facilitates restricting access to non-members of a CSG in accordance with various aspects.

FIG. 4 illustrates a wireless communication system 400 that facilitates restricting access to non-members of a CSG in accordance with various aspects. System 400 can include components and apparatus introduced in previous figures, such as member UE 120, non-member 130, access control module 112, the set of parameters 116, identification module 312, and access list 314.

According to an aspect, the set of parameters 116 can include a parameter 402 that specifies a maximum number of non-members users. While operating in a hybrid access mode, base station 110 can admit UEs, which are not member of the associated CSG, provided that, by admitting the UEs, a total number of non-member UEs does exceed parameter 402. A non-member UE is a UE (e.g., non-member UE 130) whose associated identity (e.g., identity 332) is not included on access list 314 enumerating members of the CSG.

Base station 110 can include a monitor module 404 that monitors connections between UEs and base station 110, which are currently alive. In one aspect, monitor module 404 maintains a current user list 406 that lists all active and connected UEs. Current user list 406 can include identities of connected UEs as well as indications as to whether or not each connected UE is a member of the CSG, as determined by the identification module 312. Monitor module 404 can update the current user list 406 as UEs connect, disconnect, hand off to other base stations, etc.

According to an example, access control module 112, when receiving an access request from a UE, consults identification module 312 to identify the UE as a member or non-member. For instance, when receiving an access request from non-member UE 130, access control module 112 can be notified, by identification module 312, that the UE is not a member of the CSG. Access control module 112 analyzes current user list 406 to determine a number of concurrent non-members connected to base station 110. Access control module 112 can compare the number of concurrent non-members to parameter 402 that specifies a maximum number of concurrent non-members allowed. When the number of concurrent non-members matches or exceeds the maximum number of concurrent non-members, the access control module 112 can deny the access request from non-member UE 130. However, when the number of concurrent non-members is below the maximum number specified by parameter 402, access control module 112 can elect to admit non-member UE 130.

In another example, access control module 112 can observe when the number of concurrent non-members, as indicated by current user list 406, is at or near the maximum number. In such cases, when the number of non-members reaches the maximum, access control module 112 can initiate handover procedures for one or more non-member UEs. Initiating handovers of non-member UEs can enable base station 110 to maintain a buffer from the maximum number of concurrent non-members and/or enable an incoming access request to be fulfilled while not exceeding the maximum.

Figure 5:
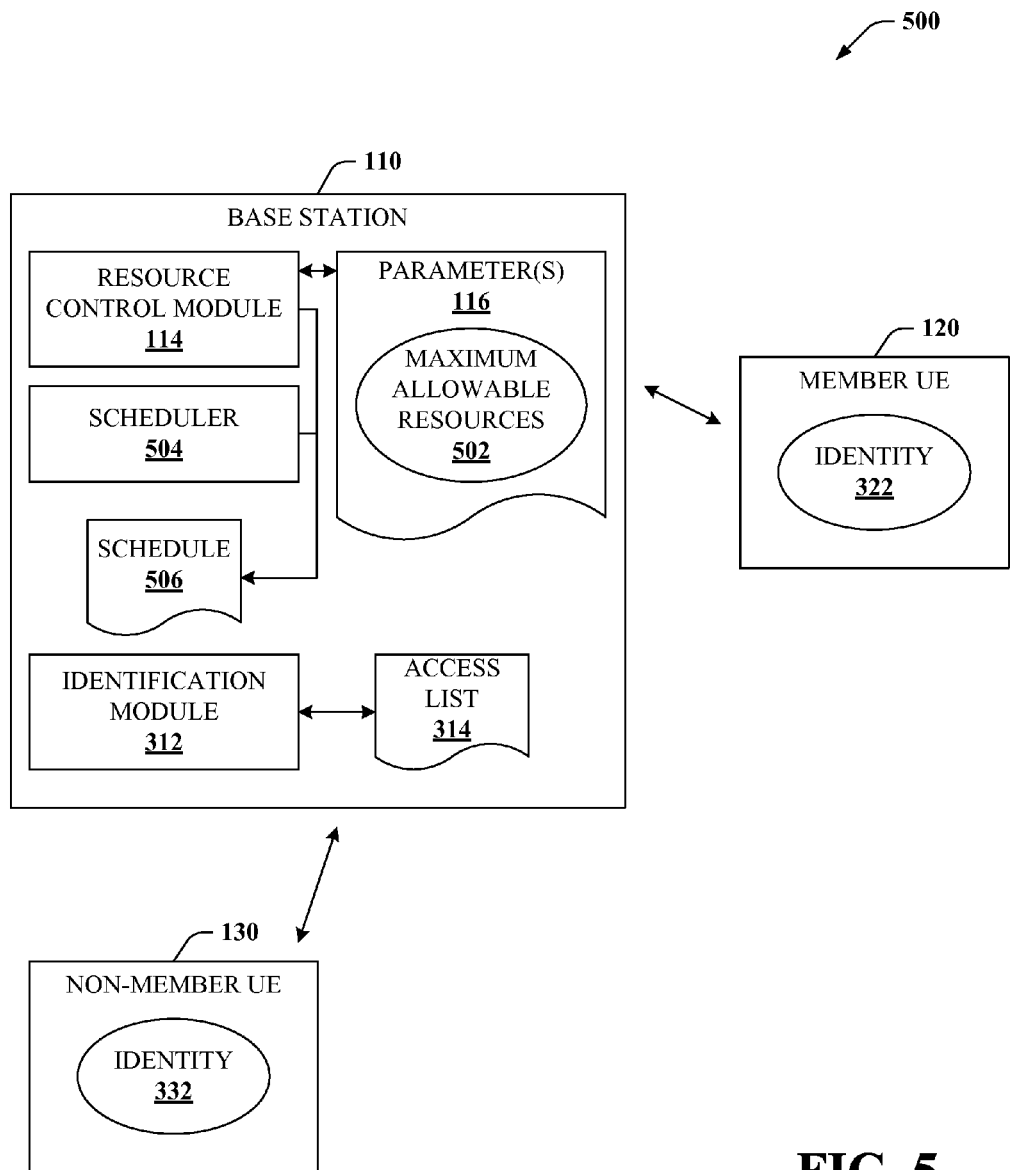
FIG. 5 illustrates an example system that facilitates management of resources for non-member of a CSG in accordance with various aspects.

Turning to FIG. 5, a system 500 is illustrated that facilitates management of resources for non-member of a CSG in accordance with various aspects. System 500 can include components and apparatus introduced in previous figures, such as base station 110, member UE 120, non-member 130, resource control module 114, the set of parameters 116, identification module 312, and access list 314. In addition, base station 110 can include a scheduler 504 that generates a schedule 506 of resources.

According to an aspect, the set of parameters 116 can include a parameter 502 that specifies a maximum amount of resources allowed to be allocated to non-members users. While operating in a hybrid access mode, base station 110 can serve UEs, which are not members of the associated CSG, provided that resources allocated to non-member UEs does not exceed a level specified by parameter 502.

Base station 110 can include scheduler 504 which schedules UEs on the downlink and/or the uplink. For downlink scheduling, scheduler 504 can allocate one or more resource blocks (e.g., a portion of time-frequency resources) on a downlink channel (such as a physical downlink shared channel (PDSCH)) of a sub-frame to a UE. For uplink scheduling, scheduler 504 assigns one or more resource blocks on an uplink channel (such as a physical uplink shared channel (PUSCH)) of a sub-frame. Scheduler 504 can assign downlink resources whenever a UE has downlink data queued for transmission. Similarly, scheduler 504 can assign uplink resources in response to a scheduling request from a UE. A current resource assignments as well as past assignments can be recorded in schedule 506 to facilitate resource management during hybrid mode operations.

Parameter 502 indicates a maximum level of resources that can be allocated non-members of the CSG. For instance, scheduler 504 can assign resources to member UE 120 without restrictions beyond limitations due to system bandwidth, effective resource utilization, data buffer sizes, etc. Scheduler 504, however, is further restricted when assigning resources to non-member UE. For example, scheduler 504 should not exceed the level specified by parameter 502.

Parameter 502 can be a maximum percentage of physical resource blocks assignable to non-members of the CSG. When expressed as a percentage, the actual amount of resource assignable becomes dependent on system bandwidth. For example, a larger system bandwidth equates to a larger number of resource blocks for a given percentage expressed by parameter 502. In another aspect, parameter 502 can express an actual maximum number of physical resource blocks which can be allocated to non-members. In such a form, the maximum resources assignable are not dependent on system bandwidth.

Resource control module 114 can interact with scheduler 504 and/or control scheduler 504 to ensure that schedule 506 generated thereby does not violate the restriction set forth by parameter 502. In an aspect, resource control module 114 can enforce parameter 502 on an instantaneous time scale (e.g., over a single scheduling period such as a single sub-frame) or on a larger time scale (e.g., an average over a plurality of sub-frames). According to an example, resource control module 114 ensures that scheduler 504, within a single sub-frame, does not assign an amount of resources to non-members, such as non-member UE 130, that exceeds a level specified by parameter 502. In another example, resource control module 114 can allow scheduler to exceed the level specified by parameter 502 in a particular sub-frame. However, for a subsequent sub-frame or sub-frames, resource control module 114 can enforce steeper restrictions on resource assignments to non-members to balance the previous deficit. In this regard, resource control module 114 enforces the maximum amount of resource assignable to non-members on average over time.

Referring to FIGS. 6-11, methodologies are described related to facilitating access control and resource management of home base stations operating in a hybrid access mode. The methodologies can be implemented by systems 100, 300, 400, and/or 500, described above. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Figure 6:
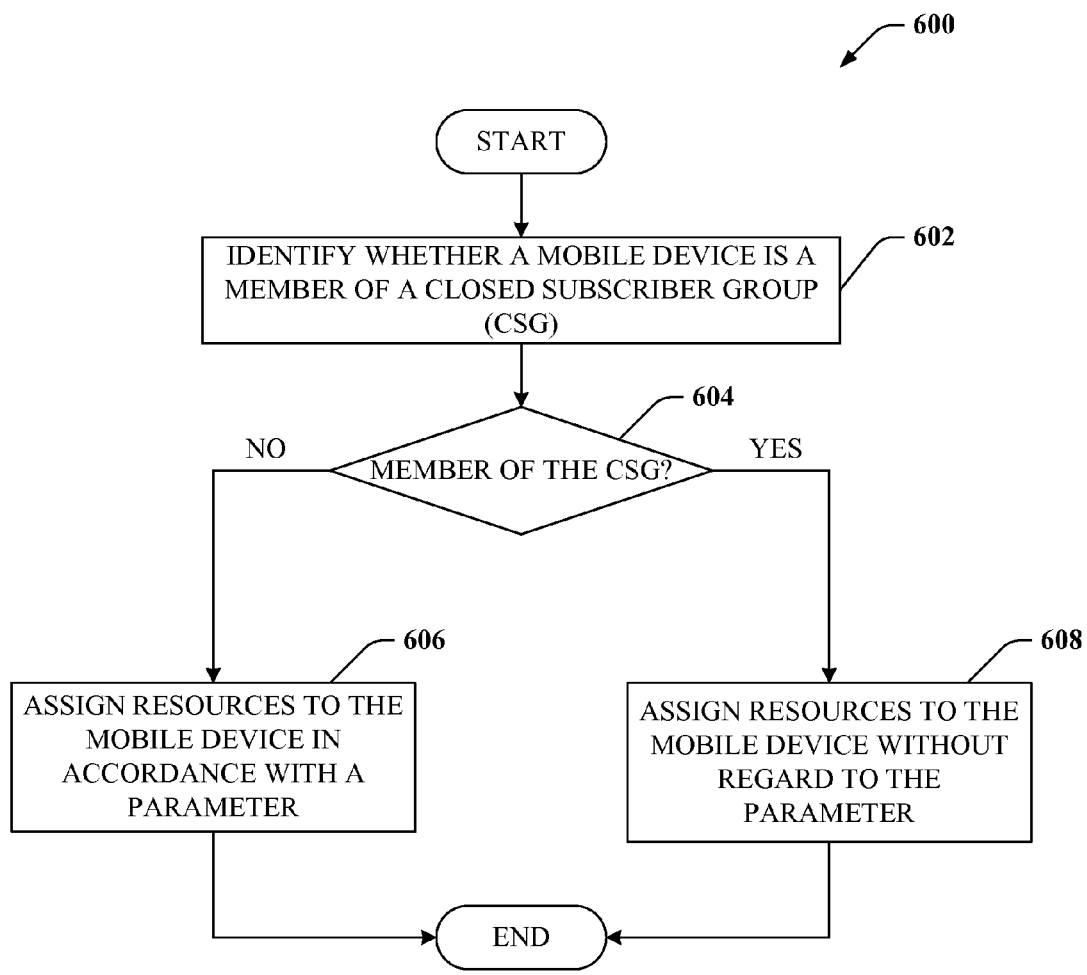
FIG. 6 is an illustration of an example methodology for managing resources in accordance with a membership status.

Turning to FIG. 6, illustrated is a method 600 for managing resources in accordance with a membership status. At reference numeral 602, a mobile device can be identified as a member or non-member of a closed subscriber group (CSG) associated with a home base station (e.g., a femto cell, a femto access point, a Home NodeB, a Home eNodeB, etc.). At reference numeral 604, method 600 can branch based upon the membership status of the mobile device. If the mobile device is not a member, then method 600 can proceed to reference numeral 606, where resource are assigned to the mobile device in accordance with a parameter. The parameter can indicate a level of resources to provide to non-members of the CSG. In one aspect, the parameter can include a percentage, wherein the percentage indicates a portion of total resources assignable to non-members. If the mobile device is a member of the CSG, the method 600 can proceed to reference numeral 608 where the mobile device is assigned resources without regard to the parameter.

Figure 7:
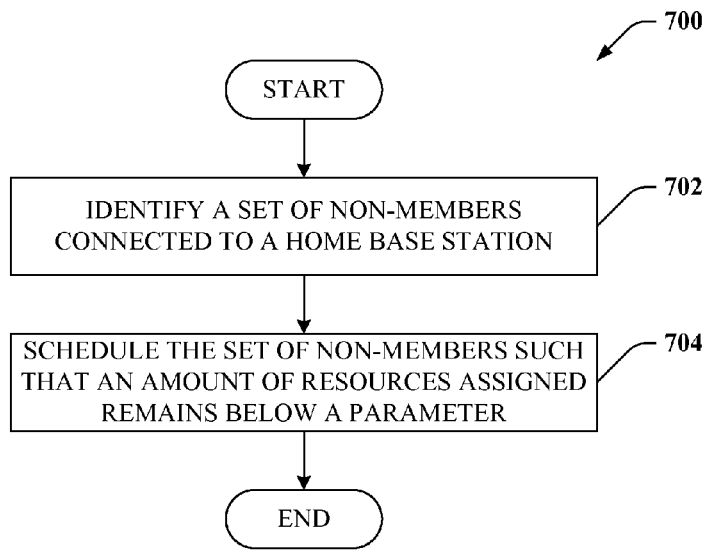
FIG. 7 is an illustration of an example methodology for scheduling a group of users which are non-members of a closed subscriber group.

Referring now to FIG. 7, a method 700 for scheduling a group of users which are non-members of a closed subscriber group is illustrated. At reference numeral 702, a set of non-members connected to a home base station are identified. At reference numeral 704, the set of non-members can be scheduled such that an amount of resources assigned to the set remains below an amount specified by a parameter that indicates a maximum amount of resources available for assignment to non-members. In one example, a portion of resources of a sub-frame can be assigned tot eh set of non-members provided that the portion of resources does not exceed the maximum amount. In another example, the amount of resource assigned to the set can be controlled such that, on average over time, the amount does not exceed the maximum.

Figure 8:
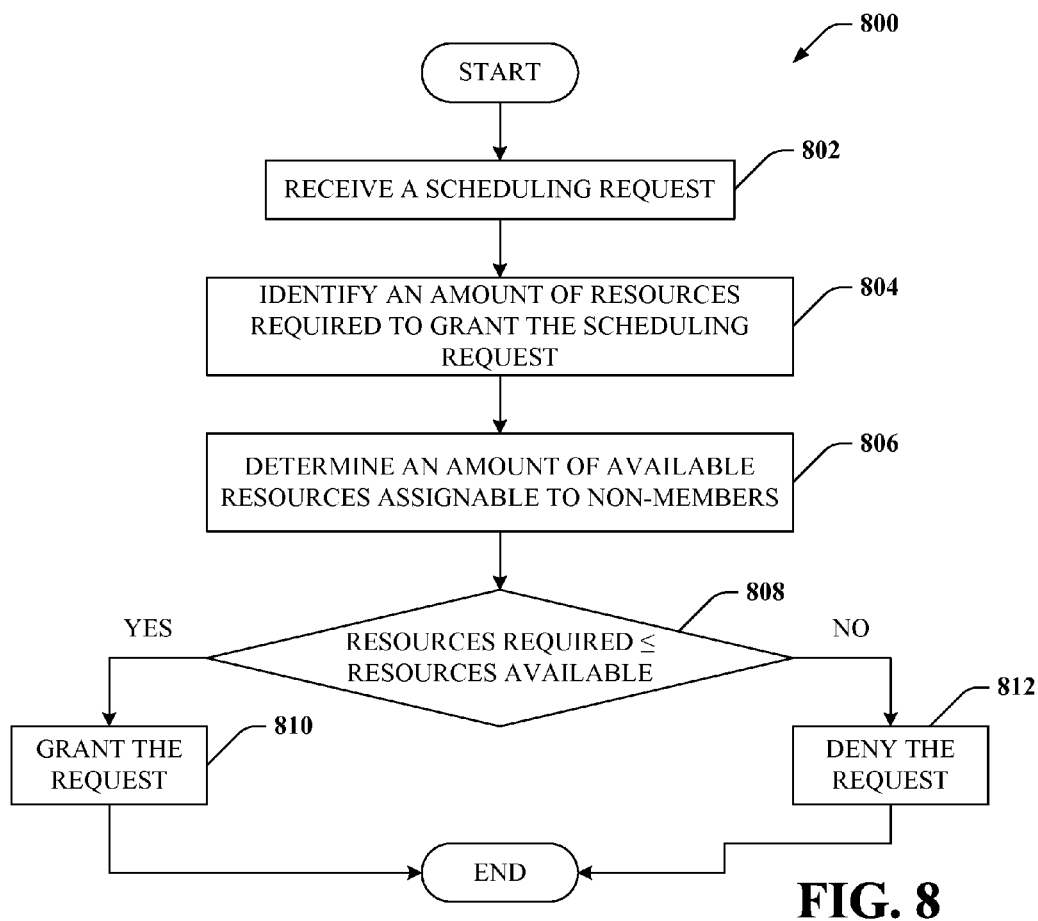
FIG. 8 is an illustration of an example methodology for handling a scheduling request from a mobile device which is not included in a CSG.

FIG. 8 illustrates a method 800 for handling a scheduling request from a mobile device which is not included in a CSG. At reference numeral 802, a scheduling request is received. The scheduling request can be petition for uplink resources. At reference numeral 804, an amount of resources required to grant the scheduling request is identified. At reference numeral 806, an amount of available resources assignable to non-members of the CSG is determined. In an example, the amount of available resources can be determined based upon a parameter that specifies a maximum amount of resources assignable to non-members and a current amount of resources assigned to non-members. At reference numeral 808, comparison is made between the amount of resources required and the amount of available resources. When the amount of resources available is greater than or equal to the amount of available resources required, method 800 can proceed to reference numeral 810 where the request is granted. When the amount of resources available is less than the amount of resources required, method 800 can proceed to reference numeral 812 where the request is denied.

Figure 9:
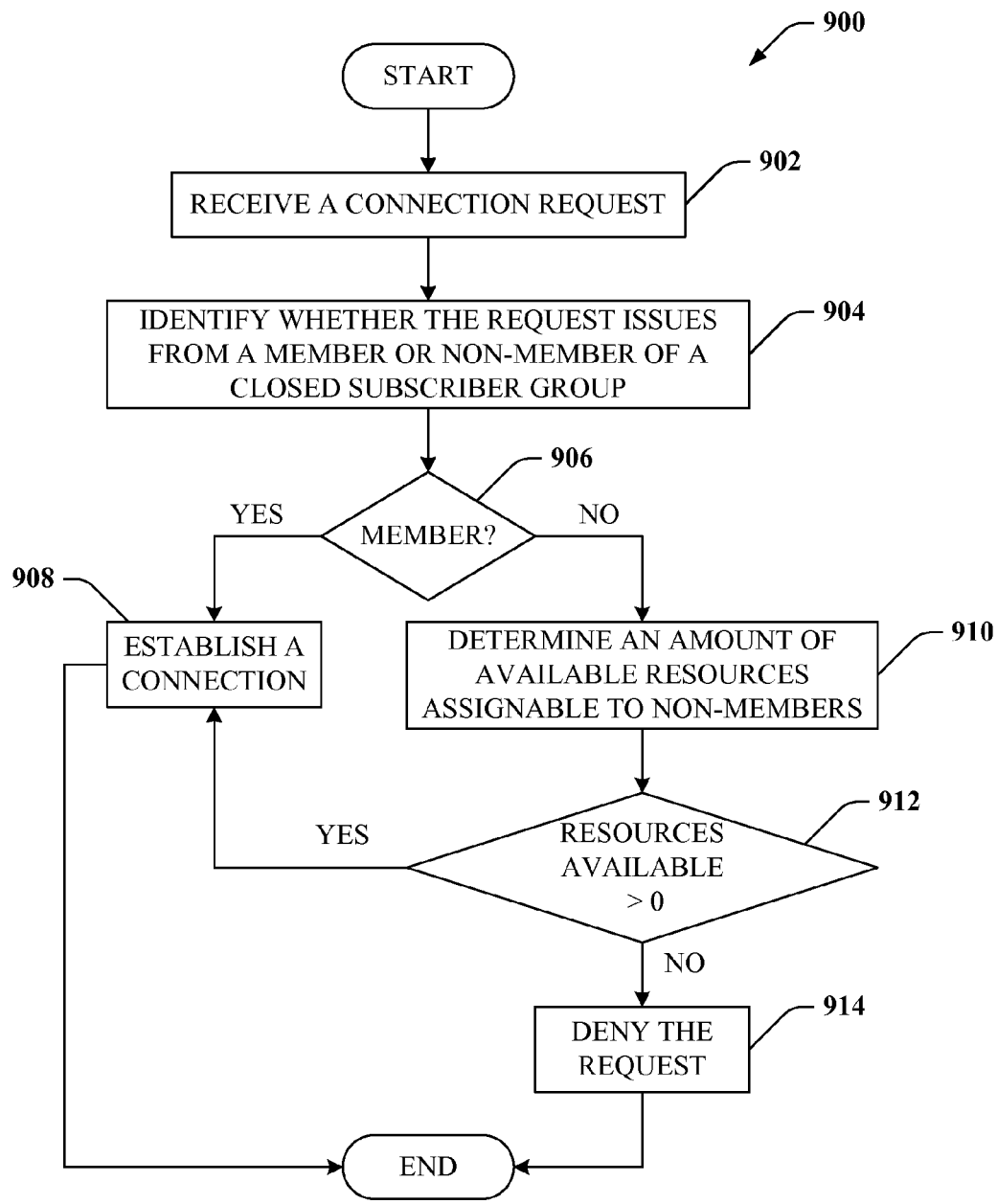
FIG. 9 is an illustration of an example methodology for handling a connection request, from a mobile device which is not a member of a CSG, based upon a resource management parameter.

FIG. 9 illustrates a method 900 for handling a connection request, from a mobile device which is not a member of a CSG, based upon a resource management parameter. At reference numeral 902, a connection request is received. At reference numeral 904, it is identified whether the request issues from a member of non-member of the CSG. If, at reference numeral 906, the request issues from a member, method 900 can proceed to reference numeral 908 where a connection is established. If, at reference numeral 906, the request issues from a non-member, method 900 can proceed to reference numeral 910 where an amount of available resources assignable to non-members is determined. At reference numeral 912, a check of the amount of available resources is made. If, at reference numeral 912, the amount of available resources is greater than zero, method 900 proceeds to reference numeral 908 where a connection is established. If the amount of available e resources is less than or equal to zero, method 900 proceeds to reference numeral 914 where the request is denied.

Figure 10:
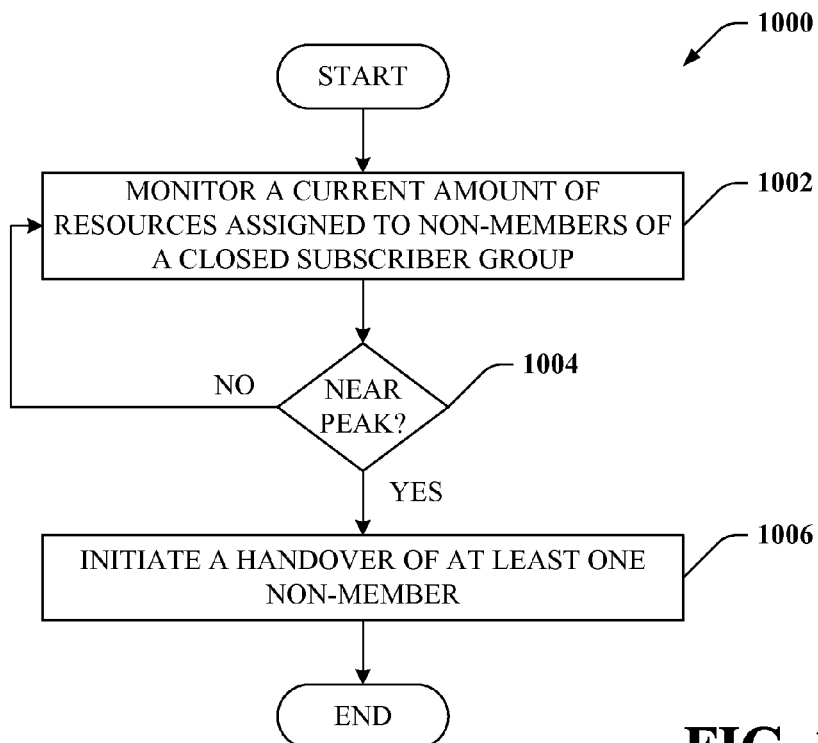
FIG. 10 is an illustration of an example methodology for employing handovers to facilitate resource management.

FIG. 10 illustrates a method for employing handovers to facilitate resource management. At reference numeral 1002, a current amount of resources assigned to non-members of a closed subscriber group is monitored. At reference numeral 1004, a check is made as to whether the current amount of resources is near a peak defined by a parameter specifying a maximum amount of resources assignable to non-members of the CSG. If the current amount of resources is not near the peak, monitoring of the amount continues. However, if the current amount of resources is near the peak, method 1000 can proceed to reference numeral 1006 where a handover of at least one non-member is initiated.

Figure 11:
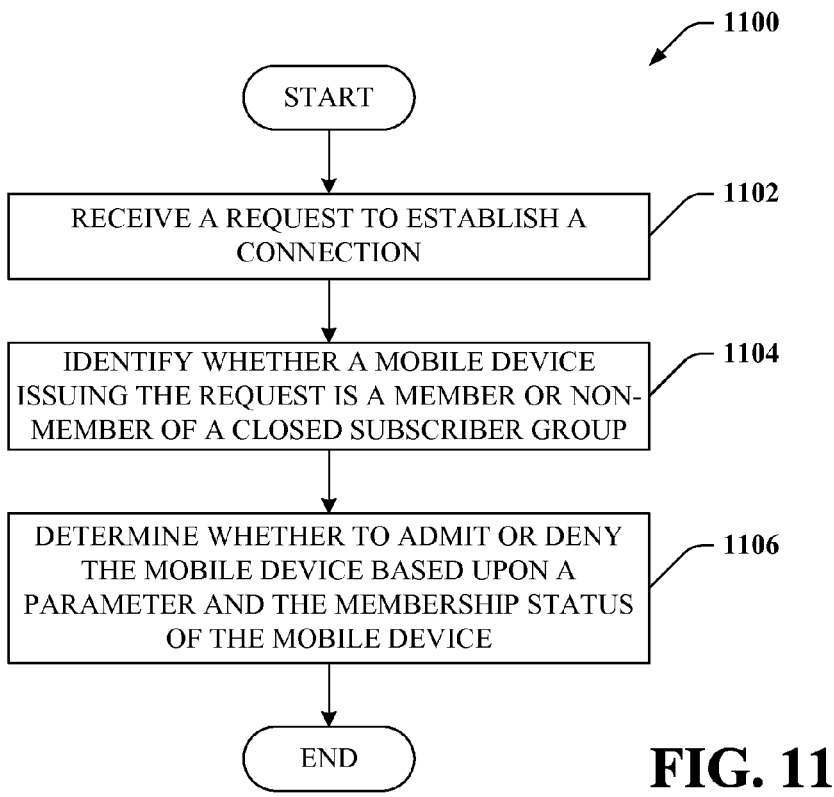
FIG. 11 is an illustration of an example methodology admission control for a home base station operating in a hybrid mode.

FIG. 11 illustrates a method 1100 for admission control for a home base station operating in a hybrid mode. At reference numeral 1002, a request to establish a connection is received. At reference numeral 1104, it can be identified whether the mobile device, issuing the request, is a member or non-member of a closed subscriber group associated with the home base station. At reference numeral 1106, it is determined whether to admit or deny the mobile device based upon a parameter and the membership status of the mobile device. In an example, the parameter can specify a maximum number of concurrent non-member users allowed. The request can be denied when a current number of non-members is greater than or equal to the maximum number. The request can be granted when the current number is less than the maximum.

It will be appreciated that, in accordance with one or more aspects described herein, inferences can be made regarding estimating available resources, estimating resource required, determining whether to initiate handovers, and the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 12:
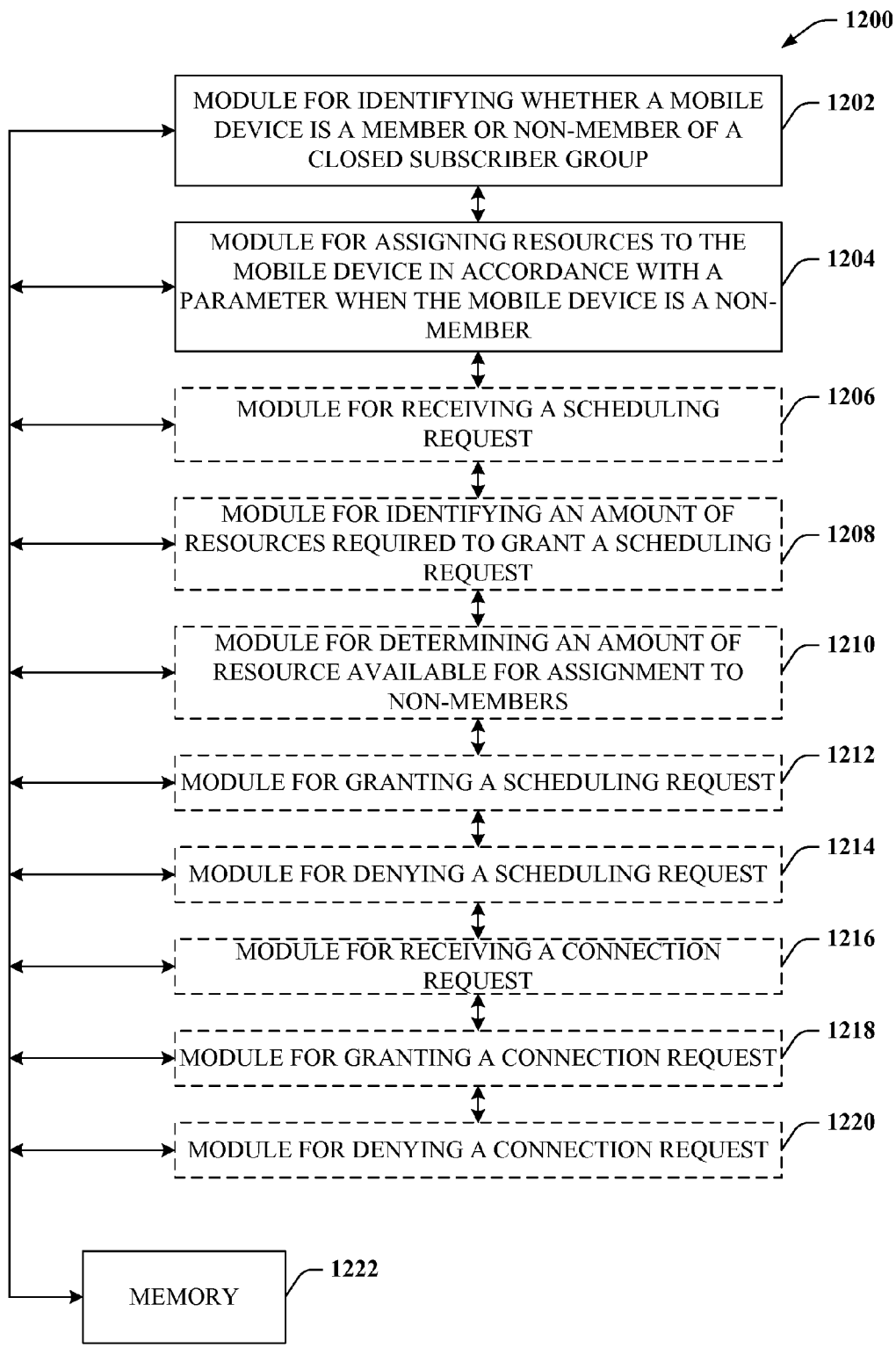
FIG. 12 is an illustration of an example apparatus that facilitates resource management for a home base station operating in a hybrid access mode in accordance with various aspects.

Referring next to FIG. 12, an apparatus 1200 that facilitates resource management for a home base station operating in a hybrid access mode is illustrated. It is to be appreciated that apparatus 1200 is represented as including functional blocks, which can be functional blocks that represent functions implemented by a processor, software, or combination thereof (e.g., firmware). Apparatus 1200 can be implemented by a base station (e.g., base station 110) and/or any other suitable network entity. Apparatus 1200 can include a module 1202 for identifying whether a mobile device is a member or non-member of a closed subscriber group, and a module 1204 for assigning resources to the mobile device in accordance with a parameter when the mobile device is a non-member. Further, apparatus 1200 can include an optional module 1206 for receiving a scheduling request, an optional module 1208 for identifying an amount of resources required to grant a scheduling request, an optional module 1210 for determining an amount of resource available for assignment to non-members, an optional module 1212 for granting a scheduling request, and an optional module 1214 for denying a scheduling request. Moreover, apparatus 1200 can include an optional module 1216 for receiving a connection request, an optional module 1218 for granting a connection request, and an optional module 1220 for denying a connection request.

Additionally, apparatus 1200 can include a memory 1222 that retains instructions for executing functions associated with modules 1202-1220.

Figure 13:
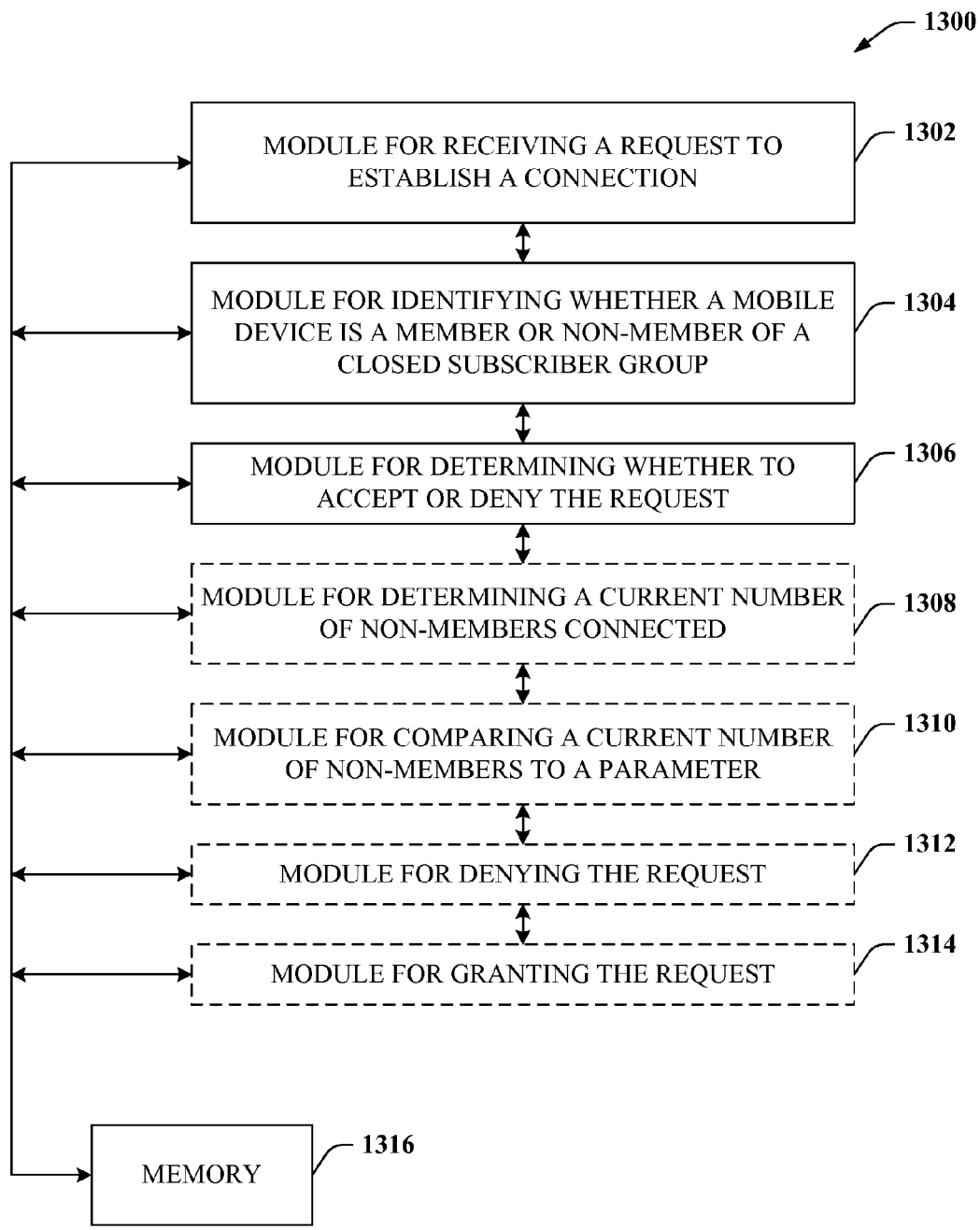
FIG. 13 is an illustration of an example apparatus that facilities admission control for a home base station operating in a hybrid access mode in accordance with various aspects.

FIG. 13 illustrates an apparatus 1300 that facilities admission control for a home base station operating in a hybrid access mode. It is to be appreciated that apparatus 1300 is represented as including functional blocks, which can be functional blocks that represent functions implemented by a processor, software, or combination thereof (e.g., firmware). Apparatus 1300 can be implemented by a base station (e.g., base station 110) and/or any other suitable network entity. Apparatus 1300 can include a module 1302 for receiving a request to establish a connection, a module 1304 for identifying whether a mobile device is a member or non-member of a closed subscriber group, and a module 1306 for determining whether to accept or deny the request. Further, apparatus 1300 can include an optional module 1308 for receiving a scheduling request, an optional module 1208 for identifying an amount of resources required to grant a scheduling request, an optional module 1210 for determining a current number of non-members connected, an optional module 1310 for comparing a current number of non-embers to a parameter, an optional module 1312 for denying the request, and an optional module 1314 for granting the request. Additionally, apparatus 1300 can include a memory 1316 that retains instructions for executing functions associated with modules 1302-1314.

Figure 14:
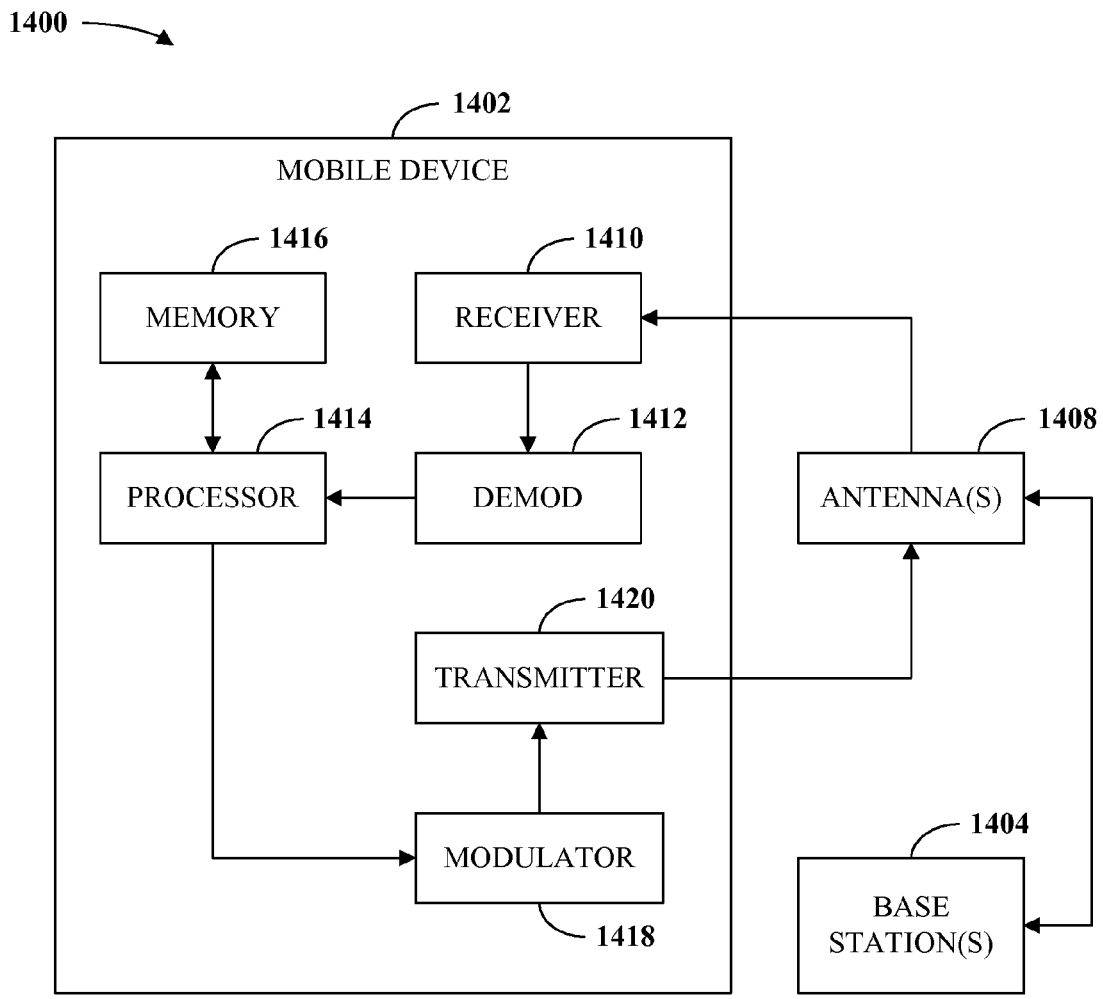
FIGS. 14-15 are block diagrams of respective wireless communication devices that can be utilized to implement various aspects of the functionality described herein.

FIG. 14 is a block diagram of another system 1400 that can be utilized to implement various aspects of the functionality described herein. In one example, system 1400 includes a mobile device 1402. As illustrated, mobile device 1402 can receive signal(s) from one or more base stations 1404 and transmit to the one or more base stations 1404 via one or more antennas 1408. Additionally, mobile device 1402 can comprise a receiver 1410 that receives information from antenna(s) 1408. In one example, receiver 1410 can be operatively associated with a demodulator (Demod) 1412 that demodulates received information. Demodulated symbols can then be analyzed by a processor 1414. Processor 1414 can be coupled to memory 1416, which can store data and/or program codes related to mobile device 1402. Mobile device 1402 can also include a modulator 1418 that can multiplex a signal for transmission by a transmitter 1420 through antenna(s) 1408.

Figure 15:
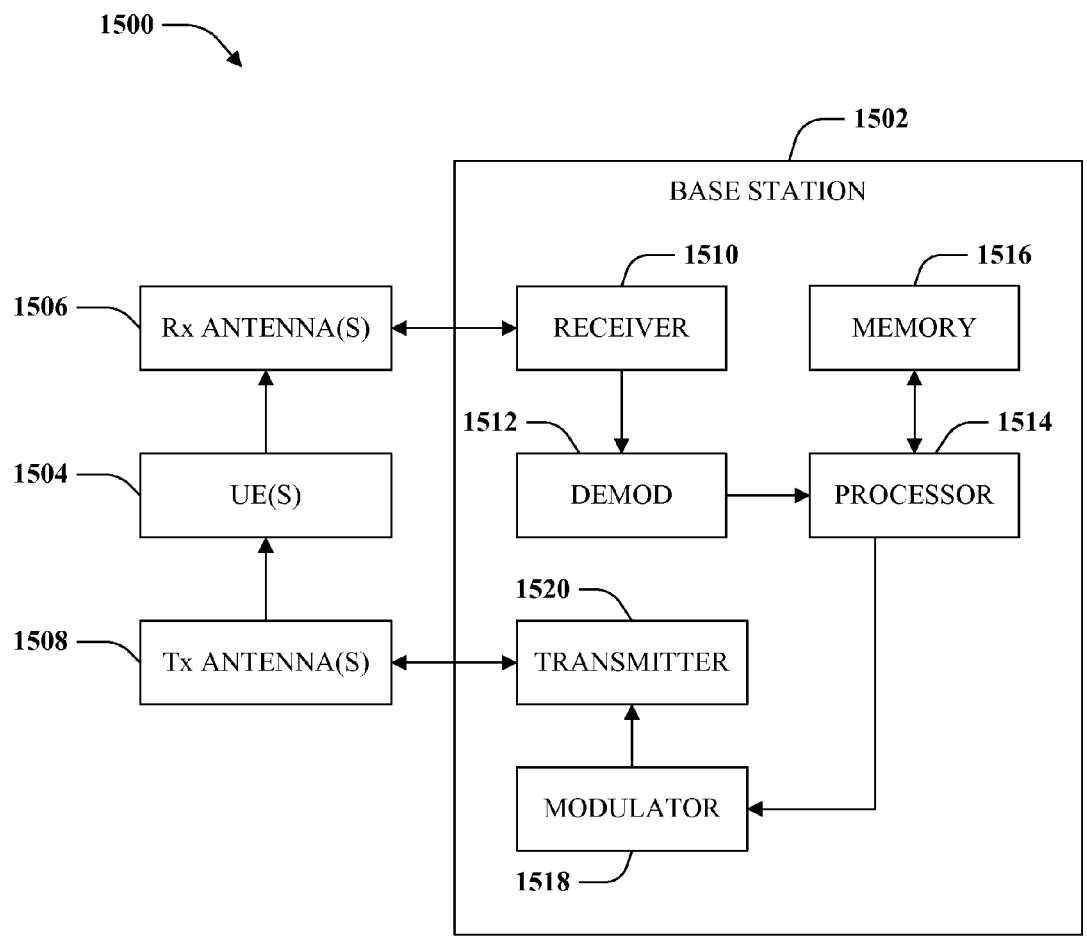

FIG. 15 is a block diagram of a system 1500 that can be utilized to implement various aspects of the functionality described herein. In one example, system 1500 includes a base station or base station 1502. As illustrated, base station 1502 can receive signal(s) from one or more UEs 1504 via one or more receive (Rx) antennas 1506 and transmit to the one or more UEs 1504 via one or more transmit (Tx) antennas 1508. Additionally, base station 1502 can comprise a receiver 1510 that receives information from receive antenna(s) 1506. In one example, the receiver 1510 can be operatively associated with a demodulator (Demod) 1512 that demodulates received information. Demodulated symbols can then be analyzed by a processor 1514. Processor 1514 can be coupled to memory 1516, which can store information related to code clusters, access terminal assignments, lookup tables related thereto, unique scrambling sequences, and/or other suitable types of information. Base station 1502 can also include a modulator 1518 that can multiplex a signal for transmission by a transmitter 1520 through transmit antenna(s) 1508.

In some aspects the teachings herein may be employed in a network that includes macro scale coverage (e.g., a large area cellular network such as a 3G networks, typically referred to as a macro cell network) and smaller scale coverage (e.g., a residence-based or building-based network environment). As an access terminal ("AT") moves through such a network, the access terminal may be served in certain locations by access nodes ("ANs") that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a Home NodeB, Home eNodeB, access point base station, femto cell, and so on.

Figure 16:
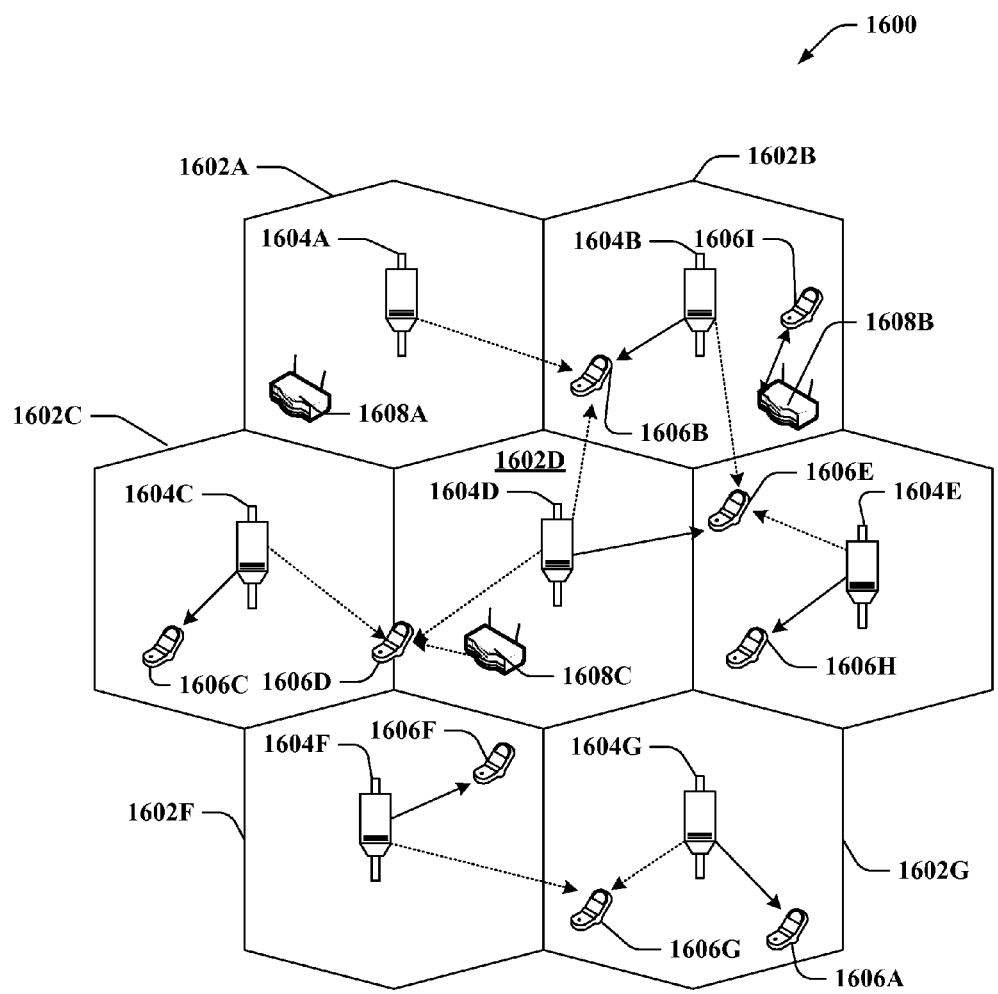
FIG. 16 illustrates an example wireless communication system in accordance with various aspects.

FIG. 16 illustrates a wireless communication system 1600, configured to support a number of users, in which the teachings herein may be implemented. The system 1600 provides communication for multiple cells 1602, such as, for example, macro cells 1602A-1602G, with each cell being serviced by a corresponding access node 1604 (e.g., access nodes 1604A-1604G). As shown in FIG. 16, access terminals 1606 (e.g., access terminals 1606A-1606L) may be dispersed at various locations throughout the system over time. Each access terminal 1606 may communicate with one or more access nodes 1604 on a forward link ("FL") and/or a reverse link ("RL") at a given moment, depending upon whether the access terminal 1606 is active and whether it is in soft handoff, for example. The wireless communication system 1600 may provide service over a large geographic region. For example, macro cells 1602A-1602G may cover a few blocks in a neighborhood.

Figure 17:
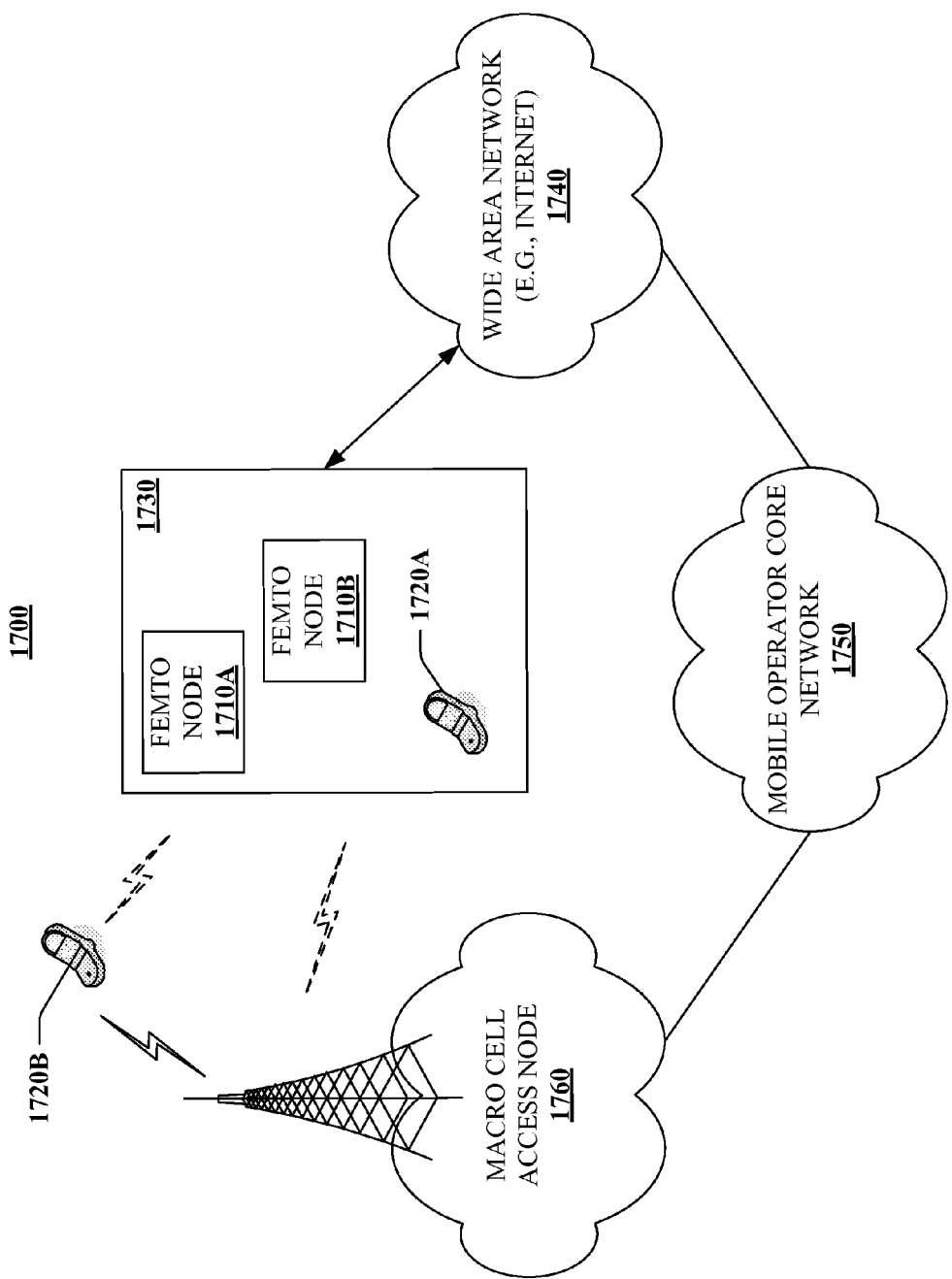
FIG. 17 illustrates an example system to enable deployment of access point base stations within a wireless network environment.

FIG. 17 illustrates an exemplary communication system 1700 where one or more femto nodes are deployed within a network environment. Specifically, the system 1700 includes multiple femto nodes 1710 (e.g., femto nodes 1710A and 1710B) installed in a relatively small scale network environment (e.g., in one or more user residences 1730). Each femto node 1710 may be coupled to a wide area network 1740 (e.g., the Internet) and a mobile operator core network 1750 via a DSL router, a cable modem, a wireless link, or other connectivity means (not shown). As will be discussed below, each femto node 1710 may be configured to serve associated access terminals 1720 (e.g., access terminal 1720A) and, optionally, alien access terminals 1720 (e.g., access terminal 1720B). In other words, access to femto nodes 1710 may be restricted whereby a given access terminal 1720 may be served by a set of designated (e.g., home) femto node(s) 1710 but may not be served by any non-designated femto nodes 1710 (e.g., a neighbor's femto node 1710).

Figure 18:
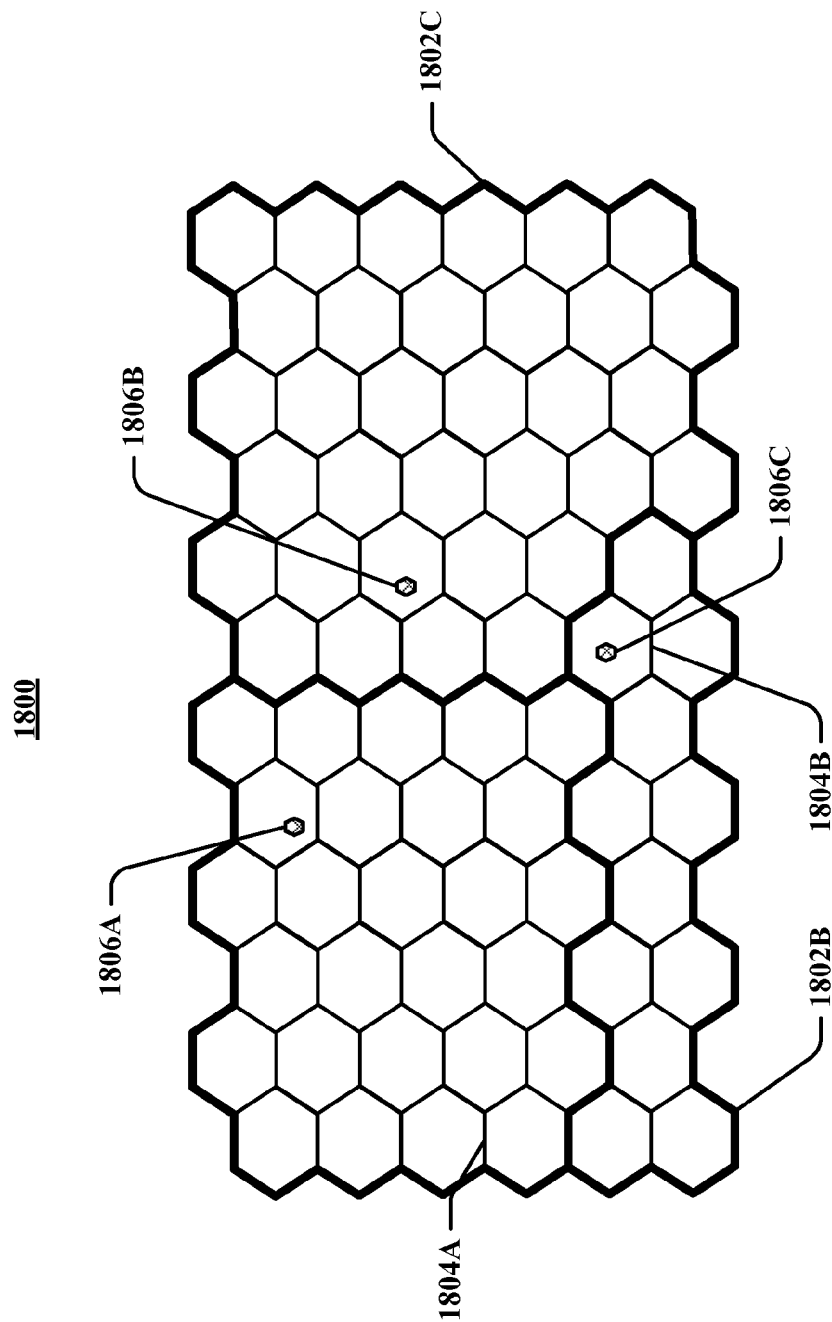
FIG. 18 illustrates an example coverage map that includes tracking areas.

FIG. 18 illustrates an example of a coverage map 1800 where several tracking areas 1802 (or routing areas or location areas) are defined, each of which includes several macro coverage areas 1804. Here, areas of coverage associated with tracking areas 1802A, 1802B, and 1802C are delineated by the wide lines and the macro coverage areas 1804 are represented by the hexagons. The tracking areas 1802 also include femto coverage areas 1806. In this example, each of the femto coverage areas 1806 (e.g., femto coverage area 1806C) is depicted within a macro coverage area 1804 (e.g., macro coverage area 1804B). It should be appreciated, however, that a femto coverage area 1806 may not lie entirely within a macro coverage area 1804. In practice, a large number of femto coverage areas 1806 may be defined with a given tracking area 1802 or macro coverage area 1804. Also, one or more pico coverage areas (not shown) may be defined within a given tracking area 1802 or macro coverage area 1804.

Referring again to FIG. 17, the owner of a femto node 1710 may subscribe to mobile service, such as, for example, 3G mobile service, offered through the mobile operator core network 1750. In addition, an access terminal 1720 may be capable of operating both in macro environments and in smaller scale (e.g., residential) network environments. In other words, depending on the current location of the access terminal 1720, the access terminal 1720 may be served by an access node 1760 of the macro cell mobile network 1750 or by any one of a set of femto nodes 1710 (e.g., the femto nodes 1710A and 1710B that reside within a corresponding user residence 1730). For example, when a subscriber is outside his home, he is served by a standard macro access node (e.g., node 1760) and when the subscriber is at home, he is served by a femto node (e.g., node 1710A). Here, it should be appreciated that a femto node 1710 may be backward compatible with existing access terminals 1720.

A femto node 1710 may be deployed on a single frequency or, in the alternative, on multiple frequencies. Depending on the particular configuration, the single frequency or one or more of the multiple frequencies may overlap with one or more frequencies used by a macro node (e.g., node 1760).

In some aspects, an access terminal 1720 may be configured to connect to a preferred femto node (e.g., the home femto node of the access terminal 1720) whenever such connectivity is possible. For example, whenever the access terminal 1720 is within the user's residence 1730, it may be desired that the access terminal 1720 communicate only with the home femto node 1710.

In some aspects, if the access terminal 1720 operates within the macro cellular network 1750 but is not residing on its most preferred network (e.g., as defined in a preferred roaming list), the access terminal 1720 may continue to search for the most preferred network (e.g., the preferred femto node 1710) using a Better System Reselection ("BSR"), which may involve a periodic scanning of available systems to determine whether better systems are currently available, and subsequent efforts to associate with such preferred systems. With the acquisition entry, the access terminal 1720 may limit the search for specific band and channel. For example, the search for the most preferred system may be repeated periodically. Upon discovery of a preferred femto node 1710, the access terminal 1720 selects the femto node 1710 for camping within its coverage area.

A femto node may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes 1710 that reside within the corresponding user residence 1730). In some implementations, a node may be restricted to not provide, for at least one node, at least one of: signaling, data access, registration, paging, or service.

In some aspects, a restricted femto node (which may also be referred to as a Closed Subscriber Group Home NodeB) is one that provides service to a restricted provisioned set of access terminals. This set may be temporarily or permanently extended as necessary. In some aspects, a Closed Subscriber Group ("CSG") may be defined as the set of access nodes (e.g., femto nodes) that share a common access control list of access terminals. A channel on which all femto nodes (or all restricted femto nodes) in a region operate may be referred to as a femto channel.

Various relationships may thus exist between a given femto node and a given access terminal. For example, from the perspective of an access terminal, an open femto node may refer to a femto node with no restricted association. A restricted femto node may refer to a femto node that is restricted in some manner (e.g., restricted for association and/or registration). A home femto node may refer to a femto node on which the access terminal is authorized to access and operate on. A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that authorized to access the restricted femto node. A guest access terminal may refer to an access terminal with temporary access to the restricted femto node. An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionality in the context of a femto node. It should be appreciated, however, that a pico node may provide the same or similar functionality for a larger coverage area. For example, a pico node may be restricted, a home pico node may be defined for a given access terminal, and so on.

Figure 19:
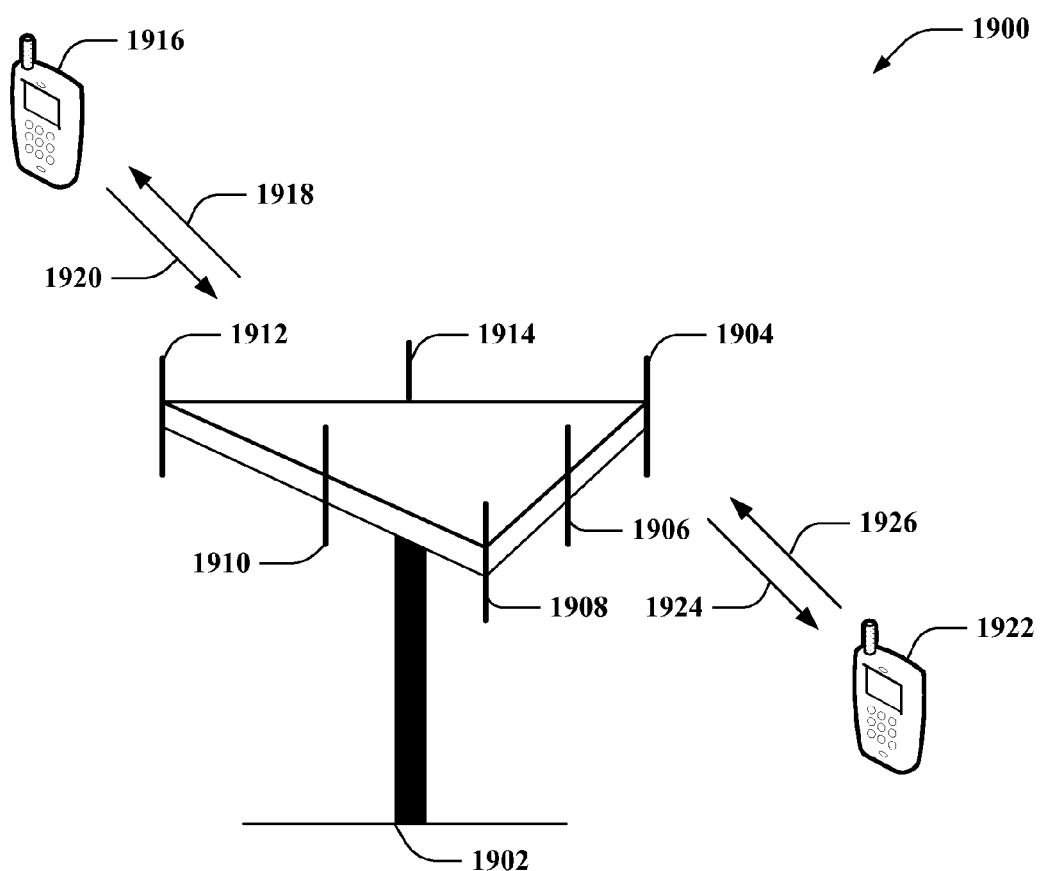
FIG. 19 is an illustration of a wireless communication system in accordance with various aspects set forth herein.

Referring now to FIG. 19, a wireless communication system 1900 is illustrated in accordance with various embodiments presented herein. System 1900 comprises a base station (e.g., access point) 1902 that can include multiple antenna groups. For example, one antenna group can include antennas 1904 and 1906, another group can comprise antennas 1908 and 1910, and an additional group can include antennas 1912 and 1914. Two antennas are illustrated for each antenna group; however, more or fewer antennas can be utilized for each group. Base station 1902 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 1902 can communicate with one or more UEs such as UE 1916 and UE 1922; however, it is to be appreciated that base station 1902 can communicate with substantially any number of UEs similar to UEs 1916 and 1922. UEs 1916 and 1922 can be, for example, cellular phones, smart phones, laptops, handheld communication devices, handheld computing devices, satellite radios, global positioning systems, PDAs, and/or any other suitable device for communicating over wireless communication system 1900. As depicted, UE 1916 is in communication with antennas 1912 and 1914, where antennas 1912 and 1914 transmit information to UE 1916 over a downlink 1918 and receive information from UE 1916 over an uplink 1920. Moreover, UE 1922 is in communication with antennas 1904 and 1906, where antennas 1904 and 1906 transmit information to UE 1922 over a downlink 1924 and receive information from UE 1922 over an uplink 1926. In a frequency division duplex (FDD) system, downlink 1918 can utilize a different frequency band than that used by uplink 1920, and downlink 1924 can employ a different frequency band than that employed by uplink 1926, for example. Further, in a time division duplex (TDD) system, downlink 1918 and uplink 1920 can utilize a common frequency band and downlink 1924 and uplink 1926 can utilize a common frequency band.

Each group of antennas and/or the area in which they are designated to communicate can be referred to as a sector of base station 1902. For example, antenna groups can be designed to communicate to UEs in a sector of the areas covered by base station 1902. In communication over downlinks 1918 and 1924, the transmitting antennas of base station 1902 can utilize beamforming to improve signal-to-noise ratio of downlinks 1918 and 1924 for UEs 1916 and 1922. Also, while base station 1902 utilizes beamforming to transmit to UEs 1916 and 1922 scattered randomly through an associated coverage, UEs in neighboring cells can be subject to less interference as compared to a base station transmitting through a single antenna to all its UEs. Moreover, UEs 1916 and 1922 can communicate directly with one another using a peer-to-peer or ad hoc technology (not shown).

According to an example, system 1900 can be a multiple-input multiple-output (MIMO) communication system. Further, system 1900 can utilize substantially any type of duplexing technique to divide communication channels (e.g., downlink, uplink, . . . ) such as FDD, FDM, TDD, TDM, CDM, and the like. In addition, communication channels can be orthogonalized to allow simultaneous communication with multiple devices or UEs over the channels; in one example, OFDM can be utilized in this regard. Thus, the channels can be divided into portions of frequency over a period of time. In addition, frames can be defined as the portions of frequency over a collection of time periods; thus, for example, a frame can comprise a number of OFDM symbols. The base station 1902 can communicate to the UEs 1916 and 1922 over the channels, which can be created for various types of data. For example, channels can be created for communicating various types of general communication data, control data (e.g., quality information for other channels, acknowledgement indicators for data received over channels, interference information, reference signals, etc.), and/or the like.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out ("MIMO") system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 20:
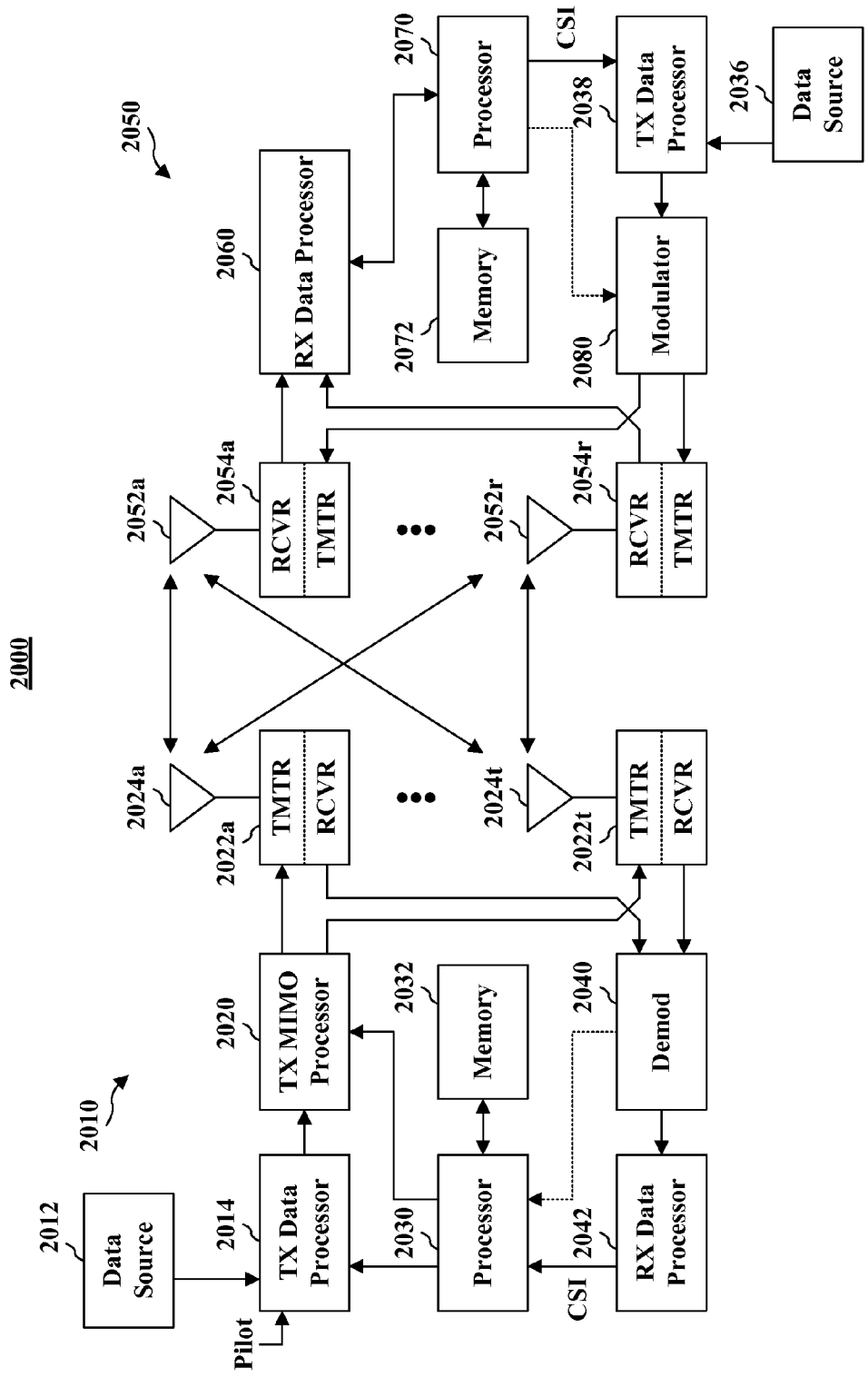
FIG. 20 is a block diagram illustrating an example wireless communication system in which various aspects described herein can function.

FIG. 20 shows an example wireless communication system 2000. The wireless communication system 2000 depicts one base station 2010 and one access terminal 2050 for sake of brevity. However, it is to be appreciated that system 2000 can include more than one base station and/or more than one access terminal, wherein additional base stations and/or access terminals can be substantially similar or different from example base station 2010 and access terminal 2050 described below. In addition, it is to be appreciated that base station 2010 and/or access terminal 2050 can employ the systems (FIGS. 1, 3, 4, 5, 12, and 13) and/or method (FIGS. 6-11) described herein to facilitate wireless communication there between.

At base station 2010, traffic data for a number of data streams is provided from a data source 2012 to a transmit (TX) data processor 2014. According to an example, each data stream can be transmitted over a respective antenna. TX data processor 2014 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 2050 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 2030.

The modulation symbols for the data streams can be provided to a TX MIMO processor 2020, which can further process the modulation symbols (e.g., for OFDM). TX MIMO processor 2020 then provides $N_T$ modulation symbol streams to $N_T$ transmitters (TMTR) 2022a through 2022t. In various embodiments, TX MIMO processor 2020 applies beamforming weights to the symbols of the data streams and to the antenna from which the symbol is being transmitted.

Each transmitter 2022 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 2022a through 2022t are transmitted from $N_T$ antennas 2024a through 2024t, respectively.

At access terminal 2050, the transmitted modulated signals are received by $N_R$ antennas 2052a through 2052r and the received signal from each antenna 2052 is provided to a respective receiver (RCVR) 2054a through 2054r. Each receiver 2054 conditions (e.g., filters, amplifies, and downconverts) a respective signal, digitizes the conditioned signal to provide samples, and further processes the samples to provide a corresponding "received" symbol stream.

An RX data processor 2060 can receive and process the $N_R$ received symbol streams from $N_R$ receivers 2054 based on a particular receiver processing technique to provide $N_T$ "detected" symbol streams. RX data processor 2060 can demodulate, deinterleave, and decode each detected symbol stream to recover the traffic data for the data stream. The processing by RX data processor 2060 is complementary to that performed by TX MIMO processor 2020 and TX data processor 2014 at base station 2010.

A processor 2070 can periodically determine which available technology to utilize as discussed above. Further, processor 2070 can formulate a reverse link message comprising a matrix index portion and a rank value portion.

The reverse link message can comprise various types of information regarding the communication link and/or the received data stream. The reverse link message can be processed by a TX data processor 2038, which also receives traffic data for a number of data streams from a data source 2036, modulated by a modulator 2080, conditioned by transmitters 2054a through 2054r, and transmitted back to base station 2010.

At base station 2010, the modulated signals from access terminal 2050 are received by antennas 2024, conditioned by receivers 2022, demodulated by a demodulator 2040, and processed by a RX data processor 2042 to extract the reverse link message transmitted by access terminal 2050. Further, processor 2030 can process the extracted message to determine which precoding matrix to use for determining the beamforming weights.

Processors 2030 and 2070 can direct (e.g., control, coordinate, manage, etc.) operation at base station 2010 and access terminal 2050, respectively. Respective processors 2030 and 2070 can be associated with memory 2032 and 2072 that store program codes and data. Processors 2030 and 2070 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, . . . ) by being broadcasted over an entire cell and being mapped to Physical layer (PHY) resources that can be used for other control/traffic channels. The UL Transport Channels can comprise a Random Access Channel (RACH), a Request Channel (REQCH), an Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method for scheduling resources for a home base station operating in a hybrid access mode, comprising:
    identifying whether a mobile device, connected to the home base station, is a member or non-member of a closed subscriber group associated with the home base station;
    determining a parameter corresponding to a maximum amount of resources assignable to non-members when the mobile device is a non-member of the closed subscriber group, wherein the determining the parameter is based on the mobile device being a non-member of the closed subscriber group;
    assigning resources for data transmission to the mobile device in accordance with the parameter;
    monitoring a current amount of resources assigned to non-members of the closed subscriber group; and
    initiating a handover for at least one non-member connected with the home base station when the current amount of resources assigned to non-members is near the maximum amount of resources as defined by the parameter.

2. The method of claim 1, further comprising:
    identifying a set of non-member mobile devices connected to the home base station; and
    scheduling the set of non-member mobile devices such that an amount of resources assigned to the set of non-member mobile devices remains below the parameter.

3. The method of claim 2, wherein scheduling further comprises assigning a portion of resources of a sub-frame to the set of non-member mobile devices such that the portion of resources does not exceed the parameter.

4. The method of claim 2, wherein the amount of resources assigned to the set of non-member mobile devices, on average over time, does not exceed the parameter.

5. The method of claim 1, wherein the parameter includes a percentage, wherein the percentage indicates a portion of total resources assignable to non-members of the closed subscriber group.

6. The method of claim 1, further comprising:
    receiving a scheduling request from the mobile device, wherein the scheduling request is a petition for uplink resources;
    identifying an amount of resources required to grant the scheduling request;
    determining an amount of available resources which are assignable to non-members based at least in part on the parameter and a current amount of resources assigned to non-members of the closed subscriber group;
    granting the scheduling request when the amount of available resources is greater than or equal to the amount of resources required; and
    denying the scheduling request when the amount of available resources is less than the amount of resources required.

7. The method of claim 1, further comprising:
    receiving a request to establish a connection from a second mobile device;
    identifying whether the second mobile device is included in the closed subscriber group;
    determining an amount of available resources which are assignable to non-members based at least in part on the parameter and a current amount of resources assigned to non-members of the closed subscriber group;
    denying the request to establish a connection when the amount of available resources is equal to zero and the second mobile device is a non-member of the closed subscriber group; and
    establishing a connection with the second mobile device when at least one of the amount of available resources is greater than zero or the second mobile device is a member of the closed subscriber group.

8. A wireless communication apparatus, comprising: at least one processor configured to:
    identify whether a mobile device, connected to the wireless communication apparatus, is a member or non-member of a closed subscriber group;
    determine a parameter corresponding to a maximum amount of resources assignable to non-members when the mobile device is a non-member of the closed subscriber group, wherein the at least one processor is configured to determine the parameter based on the mobile device being a non-member of the closed subscriber group;
    assign resources for data transmission to the mobile device in accordance with the parameter;
    monitor a current amount of resources assigned to non-members of the closed subscriber group; and
    initiate a handover for at least one non-member connected with the wireless communication apparatus when the current amount of resources assigned to nonmembers is near the maximum amount of resources as defined by the parameter.

9. The wireless communication apparatus of claim 8, wherein the at least one processor is further configured to:
    identify a set of non-member mobile devices connected to the wireless communication apparatus; and schedule the set of non-member mobile devices such that an amount of resources assigned to the set of non-member mobile devices remains below the parameter.

10. The wireless communication apparatus of claim 9, wherein the at least one processor is further configured to assign a portion of resources of a sub-frame to the set of non-member mobile devices such that the portion of resources does not exceed the parameter.

11. The wireless communication apparatus of claim 9, wherein the amount of resources assigned to the set of non-member mobile devices, on average over time, does not exceed the parameter.

12. The wireless communication apparatus of claim 8, wherein the parameter includes a percentage, wherein the percentage indicates a portion of total resources assignable to non-members of the closed subscriber group.

13. The wireless communication apparatus of claim 8, wherein the at least one processor is further configured to:
receive a scheduling request from the mobile device, wherein the scheduling request is a petition for uplink resources;
identify an amount of resources required to grant the scheduling request;
determine an amount of available resources which are assignable to non-members based at least in part on the parameter and a current amount of resources assigned to non-members of the closed subscriber group;
grant the scheduling request when the amount of available resources is greater than or equal to the amount of resources required; and
deny the scheduling request when the amount of available resources is less than the amount of resources required.

14. The wireless communication apparatus of claim 8, wherein the at least one processor is further configured to:
receive a request to establish a connection from a second mobile device;
identify whether the second mobile device is included in the closed subscriber group;
determine an amount of available resources which are assignable to non-members based at least in part on the parameter and a current amount of resources assigned to non-members of the closed subscriber group;
deny the request to establish a connection when the amount of available resources is equal to zero and the second mobile device is a non-member of the closed subscriber group; and
establish a connection with the second mobile device when at least one of the amount of available resources is greater than zero or the second mobile device is a member of the closed subscriber group.

15. An apparatus, comprising:
means for identifying whether a mobile device, connected to the apparatus, is a member or non-member of a closed subscriber group;
means for determining a parameter corresponding to a maximum amount of resources assignable to non-members when the mobile device is a non-member of the closed subscriber group, wherein the means for determining determines the parameter based on the mobile device being a non-member of the closed subscriber group;
means for assigning resources for data transmission to the mobile device in accordance with the parameter;
means for monitoring a current amount of resources assigned to non-members of the closed subscriber group; and
means for initiating a handover for at least one non-member connected with the apparatus when the current amount of resources assigned to non-members is near the maximum amount of resources as defined by the parameter.

16. The apparatus of claim 15, further comprising:
means for identifying a set of non-member mobile devices connected to the apparatus; and
means for scheduling the set of non-member mobile devices such that an amount of resources assigned to the set of non-member mobile devices remains below the parameter.

17. The apparatus of claim 16, further comprising means for assigning a portion of resources of a sub-frame to the set of non-member mobile devices such that the portion of resources does not exceed the parameter.

18. The apparatus of claim 16, wherein the amount of resources assigned to the set of non-member mobile devices, on average over time, does not exceed the parameter.

19. The apparatus of claim 15, wherein the parameter includes a percentage, wherein the percentage indicates a portion of total resources assignable to non-members of the closed subscriber group.

20. The apparatus of claim 15, further comprising:
means for receiving a scheduling request from the mobile device, wherein the scheduling request is a petition for uplink resources;
means for identifying an amount of resources required to grant the scheduling request;
means for determining an amount of available resources which are assignable to non-members based at least in part on the parameter and a current amount of resources assigned to non-members of the closed subscriber group;
means for granting the scheduling request when the amount of available resources is greater than or equal to the amount of resources required; and
means for denying the scheduling request when the amount of available resources is less than the amount of resources required.

21. The apparatus of claim 15, further comprising:
means for receiving a request to establish a connection from a second mobile device;
means for identifying whether the second mobile device is included in the closed subscriber group;
means for determining an amount of available resources which are assignable to non-members based at least in part on the parameter and a current amount of resources assigned to non-members of the closed subscriber group;
means for denying the request to establish a connection when the amount of available resources is equal to zero and the second mobile device is a non-member of the closed subscriber group; and
means for establishing a connection with the second mobile device when at least one of the amount of available resources is greater than zero or the second mobile device is a member of the closed subscriber group.

22. A computer program product, comprising:
a non-transitory computer-readable medium, comprising:
code for causing at least one computer to identify whether a mobile device, connected to a home base station, is a member or non-member of a closed subscriber group associated with the home base station;
code for causing the at least one computer to determine a parameter corresponding to a maximum amount of resources assignable to non-members when the mobile device is a non-member of the closed subscriber group, wherein the code for causing the at least one computer to determine determines the parameter based on the mobile device being a non-member of the closed subscriber group;

code for causing the at least one computer to assign resources for data transmission to the mobile device in accordance with the parameter;

code for causing the at least one computer to monitor a current amount of resources assigned to non-members of the closed subscriber group; and code for causing the at least one computer to initiate a handover for at least one non-member connected with the home base station when the current amount of resources assigned to non-members is near the maximum amount of resources as defined by the parameter.

23. The computer program product of claim 22, wherein the computer-readable medium further comprising:

code for causing the at least one computer to identify a set of non-member mobile devices connected to the home base station; and code for causing the at least one computer to schedule the set of non-member mobile devices such that an amount of resources assigned to the set of non-member mobile devices remains below the parameter.

24. The computer program product of claim 23, wherein the amount of resources assigned to the set of non-member mobile devices, on average over time, does not exceed the parameter.

25. The computer program product of claim 23, wherein the computer-readable medium further comprising code for causing the at least one computer to assign a portion of resources of a sub-frame to the set of non-member mobile devices such that the portion of resources does not exceed the parameter.

26. The computer program product of claim 22, wherein the parameter includes a percentage, wherein the percentage indicates a portion of total resources assignable to non-members of the closed subscriber group.

27. The computer program product of claim 22, wherein the computer-readable medium further comprising:

code for causing the at least one computer to receive a scheduling request from the mobile device, wherein the scheduling request is a petition for uplink resources;

code for causing the at least one computer to identify an amount of resources required to grant the scheduling request;

code for causing the at least one computer to determine an amount of available resources which are assignable to non-members based at least in part on the parameter and a current amount of resources assigned to non-members of the closed subscriber group;

code for causing the at least one computer to grant the scheduling request when the amount of available resources is greater than or equal to the amount of resources required; and code for causing the at least one computer to deny the scheduling request when the amount of available resources is less than the amount of resources required.

28. The computer program product of claim 22, wherein the computer-readable medium further comprising:

code for causing the at least one computer to receive a request to establish a connection from a second mobile device;

code for causing the at least one computer to identify whether the second mobile device is included in the closed subscriber group;

code for causing the at least one computer to determine an amount of available resources which are assignable to non-members based at least in part on the parameter and a current amount of resources assigned to non-members of the closed subscriber group;

code for causing the at least one computer to deny the request to establish a connection when the amount of available resources is equal to zero and the second mobile device is a non-member of the closed subscriber group; and code for causing the at least one computer to establish a connection with the second mobile device when at least one of the amount of available resources is greater than zero or the second mobile device is a member of the closed subscriber group.

29. An apparatus, comprising:

an identification module that determines whether a mobile device is one of a member or non-member of a closed subscriber group;

a scheduler that assigns resources to the mobile device;

a resource control module that:

determines a parameter corresponding to a maximum amount of resources assignable to non-members when the mobile device is a non-member of the closed subscriber group, wherein the resource control module determines the parameter based on the mobile device being a non-member of the closed subscriber group, and assigns resources for data transmission to the mobile device in accordance with the parameter; and a monitor module that:

monitors a current amount of resources assigned to non-members of the closed subscriber group; and initiates a handover for at least one non-member connected with the home base station when the current amount of resources assigned to non-members is near the maximum amount of resources as defined by the parameter.

30. The apparatus of claim 29, wherein the resource control module ensures that the scheduler assigns a quantity of resources to non-members that is less than or equal to the maximum amount of resources assignable.

31. The apparatus of claim 29, wherein the identification module obtains an identity associated with the mobile device and queries an access list with the identity.

32. A method for managing access to a home base station, comprising:

receiving a request, from a mobile device, to establish a connection;

identifying whether the mobile device is one of a member or a non-member of a closed subscriber group associated with the home base station;

determining a current number of non-members which are connected to the home base station;

determining whether to admit or deny the mobile device based at least in part on comparing the current number of non-members to a parameter specifying a maximum number of concurrent non-member users;

identifying when a number of concurrent non-member users reaches the maximum number specified by the parameter; and initiating a handover for at least one concurrent non-member user.

33. The method of claim 32, further comprising:
denying the request when the current number of non-members is greater than or equal to the parameter; and
admitting the mobile device when the current number of non-members is less than the parameter.

34. A wireless communication apparatus, comprising:
at least one processor configured to:
receive a request, from a mobile device, to establish a connection;
identify whether the mobile device is one of a member or a non-member of a closed subscriber group associated with the wireless communication apparatus;
determine a current number of non-members which are connected to the wireless communication apparatus;
determine whether to admit or deny the mobile device based at least in part on comparing the current number of non-members to a parameter specifying a maximum number of concurrent non-member users;
identify when a number of concurrent non-member users reaches the maximum number specified by the parameter; and
initiate a handover for at least one concurrent non-member user.

35. The wireless communication apparatus of claim 34, wherein the at least one processor is further configured to:
deny the request when the current number of non-members is greater than or equal to the parameter; and
admit the mobile device when the current number of non-members is less than the parameter.

36. An apparatus, comprising:
means for receiving a request, from a mobile device, to establish a connection;
means for identifying whether the mobile device is one of a member or a non-member of a closed subscriber group associated with the apparatus;
means for determining a current number of non-members which are connected to the apparatus;
means for determining whether to admit or deny the mobile device based at least in part on comparing the current number of non-members to a parameter specifying a maximum number of concurrent non-member users;
means for identifying when a number of concurrent non-member users reaches the maximum number specified by the parameter; and
means for initiating a handover for at least one concurrent non-member user.

37. The apparatus of claim 36, further comprising:
means for denying the request when the current number of non-members is greater than or equal to the parameter; and
means for admitting the mobile device when the current number of non-members is less than the parameter.

38. A computer program product, comprising:
a non-transitory computer-readable medium, comprising:
code for causing at least one computer to receive a request, from a mobile device, to establish a connection;
code for causing the at least one computer to identify whether the mobile device is one of a member or a non-member of a closed subscriber group associated with a home base station;
code for causing the at least one computer to determine a current number of non-members which are connected to the home base station;
code for causing the at least one computer to determine whether to admit or deny the mobile device based at least in part on comparing the current number of non-members to a parameter specifying a maximum number of concurrent non-member users;
code for causing the at least one computer to identify when a number of concurrent non-member users reaches the maximum number specified by the parameter; and
code for causing the at least one computer to initiate a handover for at least one concurrent non-member user.

39. The computer program product of claim 38, wherein the computer-readable medium further comprising:
code for causing the at least one computer to deny the request when the current number of non-members is greater than or equal to the parameter; and
code for causing the at least one computer to admit the mobile device when the current number of non-members is less than the parameter.

40. An apparatus, comprising:
an identification module that determines whether a mobile device is one of a member or non-member of a closed subscriber group;
an access control module that determines a current number of non-members which are connected to the home base station and determines whether to establish a connection with the mobile device based upon comparing the current number of non-members to a parameter specifying a maximum number of concurrent non-member users; and
a monitor module that identifies when a number of concurrent non-member users reaches the maximum number specified by the parameter and initiates a handover for at least one concurrent non-member user.

41. The apparatus of claim 40, wherein the identification module obtains an identity associated with the mobile device and queries an access list with the identity.

42. The apparatus of claim 40,
wherein the monitor module further monitors current connections between the apparatus and a plurality of mobile device and maintains a current user list that enumerates the current connections with indications as to whether mobile devices respectively associated therewith are members or non-members of the closed subscriber group, wherein the access control module analyzes the current user list in view of the parameter to implement access control decisions.

43. A method for scheduling resources for a home base station operating in a hybrid access mode, comprising:
identifying whether a mobile device, connected to the home base station, is a member or non-member of a closed subscriber group associated with the home base station;
receiving a scheduling request from the mobile device, wherein the scheduling request is a petition for uplink resources;
identifying an amount of resources required to grant the scheduling request;
determining an amount of available resources which are assignable to non-members based at least in part on a parameter and a current amount of resources assigned to non-members of the closed subscriber group, wherein the parameter indicates a maximum level of resources to provide to non-members of the closed subscriber group;
granting the scheduling request when the amount of available resources is greater than or equal to the amount of resources required; and denying the scheduling request when the amount of available resources is less than the amount of resources required.

44. A method for scheduling resources for a home base station operating in a hybrid access mode, comprising:
- identifying whether a mobile device, connected to the home base station, is a member or non-member of a closed subscriber group associated with the home base station;
- receiving a request to establish a connection from a second mobile device;
- identifying whether the second mobile device is included in the closed subscriber group;
- determining an amount of available resources which are assignable to non-members based at least in part on a parameter and a current amount of resources assigned to non-members of the closed subscriber group, wherein the parameter indicates a maximum level of resources to provide to non-members of the closed subscriber group;
- denying the request to establish a connection when the amount of available resources is equal to zero and the second mobile device is a non-member of the closed subscriber group; and
- establishing a connection with the second mobile device when at least one of the amount of available resources is greater than zero or the second mobile device is a member of the closed subscriber group.

* * * * *